(12) United States Patent
Previtali et al.

(10) Patent No.: US 9,371,874 B2
(45) Date of Patent: Jun. 21, 2016

(54) ASSEMBLY OF A CALIPER BODY OF A DISC BRAKE AND HUB BRACKET

(75) Inventors: Alberto Previtali, Curno (IT); Luca Gelfi, Curno (IT); Carlo Cantoni, Curno (IT); Raffaello Passoni, Curno (IT); Alberto Comendull, Curno (IT)

(73) Assignee: FRENI BREMBO S.P.A.

( * ) Notice: Subject to any disclaimer, the term of this patent is extended or adjusted under 35 U.S.C. 154(b) by 34 days.

(21) Appl. No.: 13/883,409

(22) PCT Filed: Nov. 4, 2011

(86) PCT No.: PCT/IB2011/054938
§ 371 (c)(1),
(2), (4) Date: Jul. 1, 2013

(87) PCT Pub. No.: WO2012/059894
PCT Pub. Date: May 10, 2012

(65) Prior Publication Data
US 2013/0277158 A1    Oct. 24, 2013

(30) Foreign Application Priority Data
Nov. 5, 2010    (IT) .......................... MI2010A002058

(51) Int. Cl.
*F16D 65/00*        (2006.01)
*F16D 55/228*       (2006.01)
*F16D 55/00*        (2006.01)

(52) U.S. Cl.
CPC .......... *F16D 65/0075* (2013.01); *F16D 55/228* (2013.01); *F16D 2055/0012* (2013.01); *F16D 2055/0016* (2013.01)

(58) Field of Classification Search
USPC .......... 188/73.39, 73.41–73.43, 73.46, 73.47
See application file for complete search history.

(56) References Cited

U.S. PATENT DOCUMENTS 7,540,512 B2 *   6/2009   Lesch et al. .............. 280/93.512
7,896,141 B2 *   3/2011   Baumgartner et al. .... 188/73.46

(Continued)

FOREIGN PATENT DOCUMENTS

JP    2000336408        12/2000
JP    2000337408 A      12/2000

(Continued)

OTHER PUBLICATIONS

International Search Report; International Application Number: PCT/IB2011/054938, 12 pages, Nov. 26, 2013.

(Continued)

*Primary Examiner* — Christopher Schwartz
(74) *Attorney, Agent, or Firm* — Thomas Horstemeyer, LLP

(57) ABSTRACT

An Assembly (1) of a fixed caliper and hub bracket (101), comprises a fixed caliper (2) having a first vehicle-side elongated portion (7) that comprises a first disc entry-side tangential end (8) and a second disc exit-side tangential end (9); said portion (7) being suitable for facing an axial inner surface (10) thereof towards a first braking surface (4) of the disc (3); said first portion (7) housing at least one cylinder (11) suitable for receiving a piston; said caliper body (6) also comprises a second wheel-side elongated portion (12) that comprises a first disc entry-side tangential end (14) and a second disc exit-side end (15); said second portion (12) houses at least one cylinder (16); said first and second elongated portions (7, 12) being connected together by at least one bridge (17); said caliper body (6) also comprises at least one first seat (18) arranged in said first vehicle-side elongated portion (7) to receive a first connection element (19) to connect said fixed caliper to a hub bracket (101); said hub bracket (101) making a support for the fixed caliper (2) and comprises a hub bracket body (102) suitable for housing a bearing to support a hub able to be connected to said disc (3) and to a wheel of the vehicle; said hub bracket body (102) comprises at least one fourth seat (103) to receive said first connection element (19) to firmly connect said first vehicle-side elongated portion (7) to said hub bracket body (102); wherein said caliper body (6) comprises at least one second seat (20) to receive a second connection element (21) and that is arranged in said second wheel-side elongated portion (12), and in which said hub bracket body (102) has an arm (104) that from said hub bracket body (102) extends astride of the disc (3) taking a portion of the arm (105) in said wheel-side volume (V2), and in which said portion of the arm arranged on the wheel side (105) has a fifth seat (106) to receive a second connection element (107) for the connection of the caliper body (6) to the hub bracket body (102).

15 Claims, 25 Drawing Sheets

(56) References Cited

U.S. PATENT DOCUMENTS

| | | | |
|---|---|---|---|
| 2003/0178261 A1* | 9/2003 | Ciotti et al. | 188/73.43 |
| 2006/0237267 A1* | 10/2006 | Brown et al. | 188/73.31 |
| 2007/0137953 A1* | 6/2007 | Paul et al. | 188/73.46 |
| 2008/0087507 A1* | 4/2008 | DeMorais et al. | 188/73.39 |
| 2008/0135352 A1* | 6/2008 | Bell | 188/73.39 |
| 2010/0012443 A1* | 1/2010 | Paul et al. | 188/73.46 |
| 2011/0247905 A1* | 10/2011 | Thomas et al. | 188/73.31 |

FOREIGN PATENT DOCUMENTS

| | | |
|---|---|---|
| JP | 2007032719 | 2/2007 |
| JP | 2007032719 A | 2/2007 |

OTHER PUBLICATIONS

International Search Report; IT MI20102058; Prepared by Reinhold Becker, Aug. 5, 2011.

* cited by examiner

| | Caliper deformation along a direction parallel to the disc braking surfaces - ratio between the new solution and the state of the art |
|---|---|
| Measurement point B | -14% |
| Measurement point A | -22% |

| | Master cylinder position - ratio between the new solution and the state of the art |
|---|---|
| | -19% |

ASSEMBLY OF A CALIPER BODY OF A DISC BRAKE AND HUB BRACKET

CROSS-REFERENCE TO RELATED APPLICATIONS

This application is the 35 U.S.C. §371 national stage of PCT application PCT/IB2011/054938, filed Nov. 4, 2011 which claims priority to Italian Patent Application No. MI2010A002058, dated Nov. 5, 2010, both of which are incorporated by reference in their entirety.

FIELD

The present invention refers to an assembly of a fixed caliper and hub bracket of a disc brake, as well as to a caliper body of a fixed caliper and a hub bracket or support element of the caliper.

In particular, the present invention refers to a caliper and a caliper body for a disc brake, for example for a motor vehicle. In particular, in a disc brake, the brake caliper is arranged astride of the outer peripheral margin of a brake disc. The brake caliper usually comprises a body having two elongated elements that are arranged so as to face opposite braking surfaces of a disc. Friction pads are foreseen arranged between each elongated element of the caliper and the braking surface of the brake disc. Said elongated elements of the body of the caliper have cylinders suitable for receiving hydraulic pistons capable of exerting a thrusting action on the pads, abutting them against the braking surfaces of the disc to exert a braking action on the vehicle.

BACKGROUND

The brake calipers are usually fixedly connected to a support structure or hub bracket that stays immobile with respect to the disc, like for example a structure for discharging the braking action to the stub axle of a vehicle's suspension.

In a typical arrangement, one of the two elongated elements of the fixed caliper body has attachment portions of the body of the caliper to the support structure, for example foreseeing slots or eyelets, for example arranged axially, or through holes, for example arranged radially, suitable for receiving screws or stud bolts for fixing the caliper that, with their ends are received in threaded holes foreseen on the support of the caliper.

In a typical caliper body construction, the elongated elements arranged facing the braking surfaces of the disc are connected together by bridge elements arranged astride of the disc.

The caliper comprises various components mounted on the body such as pistons, gaskets, drainage devices and brake fluid supply ducts.

Typically, the body of the caliper is made from metal like for example aluminium, or aluminium alloy, for example aluminium and lithium or steel. The body of the caliper can be obtained by casting, but also by mechanical chip removal machining, as well as by forging.

The body of the caliper can be produced both in a single piece or monoblock, and also in two half-calipers typically connected together along a plane that usually coincides with the middle plane of the disc on which the caliper is arranged astride.

In the case in which the driver of the vehicle wishes to brake or slow down the speed of the vehicle, he applies a pressure on the brake pedal. Such pressure on the brake pedal, by means of a brake pump, exerts a pressure on the brake fluid that, through a duct, applies on the brake fluid present in the hydraulic circuit arranged inside the body of the caliper until it reaches the cylinders where the pressure is exerted on the bottom surface of the pistons, forcing them to clamp against the pads, which in turn abut against the braking surfaces of the disc.

The pressure action of the brake fluid is also exerted on the bottom wall of the cylinder causing a reaction in the body of the caliper that deforms it away from the surfaces of the disc and, due to the constraint between the caliper and its support arranged only on the side of the caliper of the hub-side elongated element, a shearing deformation and torsion that makes the elongated element not constrained to the support or wheel-side elongated element move with respect to the hub-side elongated element, bending the connection bridges between these elongated elements. The body of the caliper also deforms as a function of the torque exerted by the action of the pistons that abut the pads against the braking surfaces of the disc applied in directions that form torque arms with respect to the attachment points of the caliper body to its support. These torques also deform the caliper body in the tangential and radial direction with respect to the disc, as well as in the axial direction. This deformation of the body of the caliper leads to an increase in the stroke of the pistons and therefore to an increase in the stroke of the brake pedal.

The caliper body must therefore have a sufficient structural rigidity, so as to ensure that this deformation of the body of the caliper caused by the braking action is kept within tolerable values, which as well as avoiding damage to the braking system do not create the sensation for the driver of an unresponsive braking system, determining an extra stroke of the lever or pedal of the braking system creating a feeling of a spongy system. This requirement pushes towards having extremely rigid structures for the bodies of the calipers and therefore towards increasing their bulk and weight, in applications where this is possible.

On the other hand, since the body of the caliper is fixedly connected to the vehicle's suspension and is arranged astride of the disc, it is one of the unsuspended masses that it is wished to reduce as much as possible or to keep the weight constant whilst increasing the performance, also in braking, of the vehicle.

Of course, these considerations are taken to the extreme when the vehicle is for racing and the user wishes to have a braking system that is extremely responsive to his commands and at the same time extremely light so as not to penalize the performance of the racing vehicle.

Therefore, there is a great need for an assembly of a caliper for a disc brake and its support or hub bracket that has improved structural characteristics for the same weight of the body of the caliper, or else having a lower weight with respect to solutions of the prior art for the same structural characteristics.

Solutions for caliper bodies are known that a specially studied to increase the characteristics of structural rigidity. For example European patent application EP-A-2022999, European patent application EP-A-153497, U.S. Pat. No. 6,708,802, European patent application EP-A-1911989, international patent application PCT/EP2005/050615, Japanese patent applications JP-A-09257063 and JP-A-2000/337408, American patent application US 2010/0012443 and U.S. Pat. No. 3,183,999 all present solutions of bodies for brake calipers equipped with reinforcement elements, for example arranged around the caliper bodies or between the caliper body and its support. In some of these known solutions the caliper body is of the type that is symmetrical according to planes passing through the axis of the disc or through the middle of the disc. In other solutions the caliper body has large and distributed windows also passing right through that form elongated reinforcement elements arranged longitudinally to the body of the caliper.

These known solutions, however, do not make it possible to obtain assemblies of a caliper and its support that maximise the structural rigidity of the body of the caliper while keeping the weights unaltered and at the same time are capable of keeping to bulk as low as possible so as to facilitate the mounting of the body of the caliper also inside a rim and wheel on which brake discs having a large diameter are mounted.

Document JP 2007-032719-A to ADVICS KK shows a brake caliper for a motor vehicle formed in one piece with a main caliper body that extends from the fork of the motor vehicle arranged at the side of the wheel and of the brake disc. Outer portions of caliper body are connected to the fork.

However, this known solution cannot be applied to an automobile that, unlike a motor vehicle, has the wheel arranged on the outer side of the vehicle and forces the provision of a support or hub bracket to connect the caliper to the suspension through a bearing. In other words, the fork of the motor vehicle is arranged substantially coplanar to the caliper body and can be easily connected to it. Moreover, in a motor vehicle there are not restrictions as to the bulk of the connections of the caliper to the fork, whereas in an automobile the entire braking system must be substantially housed inside the rim of the wheel, preventing easy connection of the caliper body to its support. Moreover, this known solution foresees the connection of the caliper body to the fork through attachments with axial pins or connections with radial screws, being not very effective in counteracting the deformation of the caliper body when stressed by the braking action.

BRIEF SUMMARY

The purpose of the present invention is therefore to propose an assembly of a caliper and its support that is able to reduce the overall deformation of the assembly, making it necessary to use a smaller amount of brake fluid to obtain the same pressure of braking action.

These and further purposes are accomplished through an assembly as described by the attached claim 1, as well as by a caliper body as described in claim 15 and a hub bracket as defined in claim 16.

In accordance with a general embodiment, an assembly of a fixed caliper and hub bracket of a disc brake comprises a fixed caliper, suitable for being arranged astride of a disc for a disc brake. Said disc comprises a first braking surface and a second braking surface opposite the first and defining an axial direction parallel to a rotation axis thereof, a tangential or circumferential direction parallel to one of its braking surfaces, with disc entry direction and disc exit direction, and a radial direction perpendicular to the axial direction and to the circumferential or tangential direction, the latter defining an outer radial direction when facing away from the rotation axis of the disc. Said disc defines a vehicle-side volume suitable for comprising the space that from the plane containing the disc proceeds towards the vehicle, and a wheel-side volume comprising the space that from the plane containing the disc goes away from the vehicle.

Advantageously, said fixed caliper comprises a caliper body having a first vehicle-side elongated portion. Said vehicle-side elongated portion comprises a first disc entry-side tangential end and a second disc exit-side tangential end. Said vehicle-side elongated portion is suitable for facing an axial inner surface thereof towards the first braking surface of the disc. Said first vehicle-side elongated portion houses at least one cylinder suitable for receiving a piston to exert a pressure on at least one pad housed between said vehicle-side elongated portion of the caliper body and said braking surface of the disc.

In accordance with an embodiment, said caliper body also comprises a second wheel-side elongated portion with an axial inner surface thereof facing the second braking surface of the disc and comprising a first disc entry-side tangential end and a second disc exit-side end. Said second wheel-side elongated portion houses at least one cylinder suitable for receiving a piston to exert a pressure on an opposite pad housed between said second wheel-side elongated portion of the caliper body and said second braking surface of the disc.

Said first and second elongated portions are connected together by at least one bridge arranged astride of the disc that firmly connects said first vehicle-side elongated portion to said second wheel-side elongated portion so as to prevent their relative movements and limit the deformation of the caliper body.

Said caliper body also comprises at least one first seat to receive a first connection element to connect said fixed caliper to said hub bracket. Said at least one first seat is arranged in said first vehicle-side elongated portion.

Said hub bracket of said assembly makes a support for the fixed caliper and comprises a hub bracket body arranged substantially in said vehicle-side volume. Said hub bracket body is suitable for being connected to an arm of the vehicle's suspension and comprises at least one third seat or disc-exit-side bracket seat to receive said first connection element to firmly connect said first vehicle-side elongated portion to said hub bracket body.

Advantageously, said caliper body of said fixed caliper comprises at least one second seat to receive a second connection element, and said at least one second seat is arranged in said second wheel-side elongated portion. Said hub bracket body has an arm that from said hub bracket body extends astride of the disc taking a portion of the arm in said wheel-side volume. Said portion of the arm arranged on the wheel side has a fourth seat or disc-entry-side bracket seat to receive the second connection element for the connection of the caliper body to the hub bracket body.

Advantageously, said hub bracket body is suitable for housing a bearing to support a hub able to be connected to said disc and to a wheel of the vehicle.

Said fourth seat or disc-entry-side bracket seat of the hub bracket body and said second seat of the caliper body extend according to the substantially tangential direction or substantially parallel to a tangential direction.

Further purposes, solutions and advantages are present in the embodiments described hereafter and claimed in the dependent claims attached hereto.

BRIEF DESCRIPTION OF THE SEVERAL VIEWS OF THE DRAWINGS

Different embodiments of the invention will now be described through example embodiments given as non-limiting examples, with reference in particular to the attached figures, in which.

DETAILED DESCRIPTION

Figure 1:
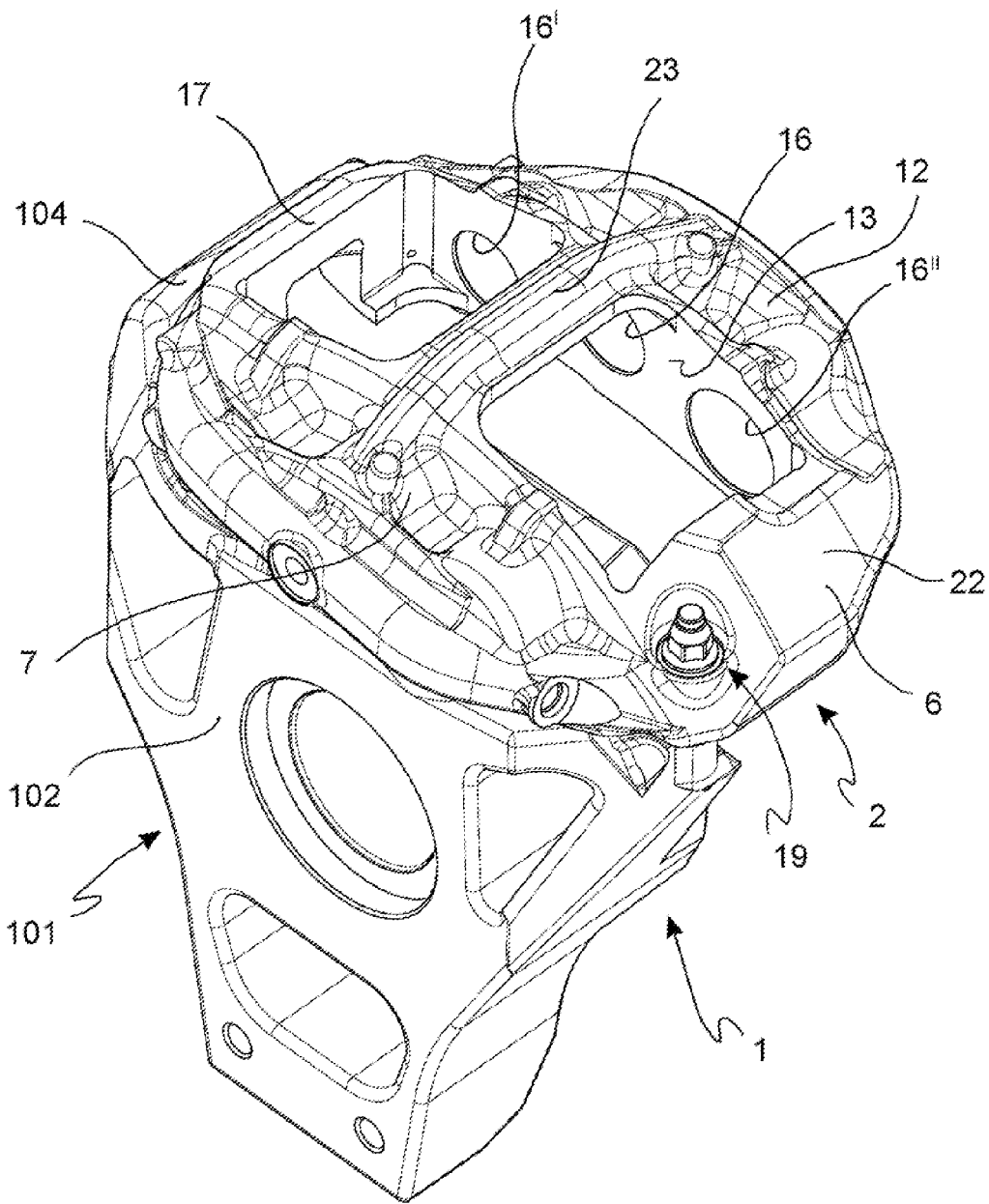
FIG. 1 represents a vehicle-side axonometric view of an assembly of a caliper for a disc brake with its support or hub bracket or torsion plate, connected together in operative conditions but not subject to braking action.
Figure 2:
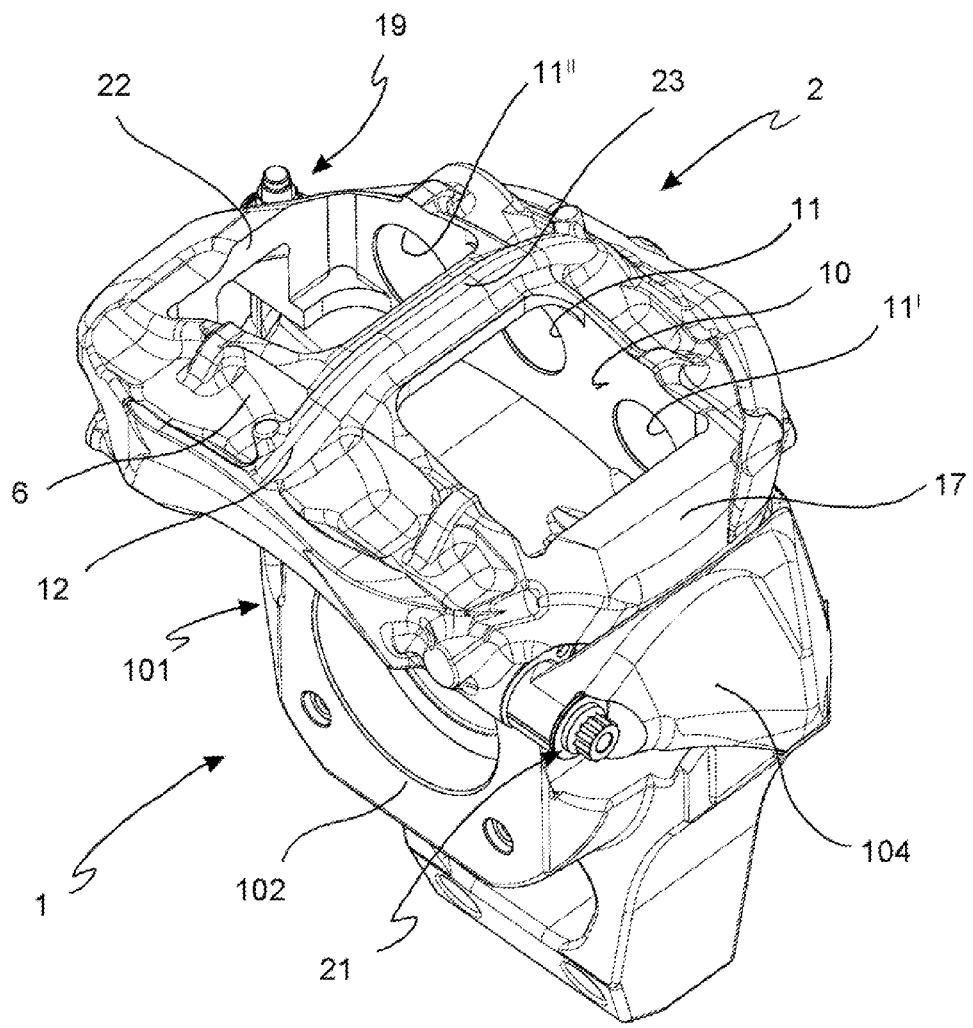
FIG. 2 represents a wheel-side axonometric view of the assembly of FIG. 1.
Figure 3:
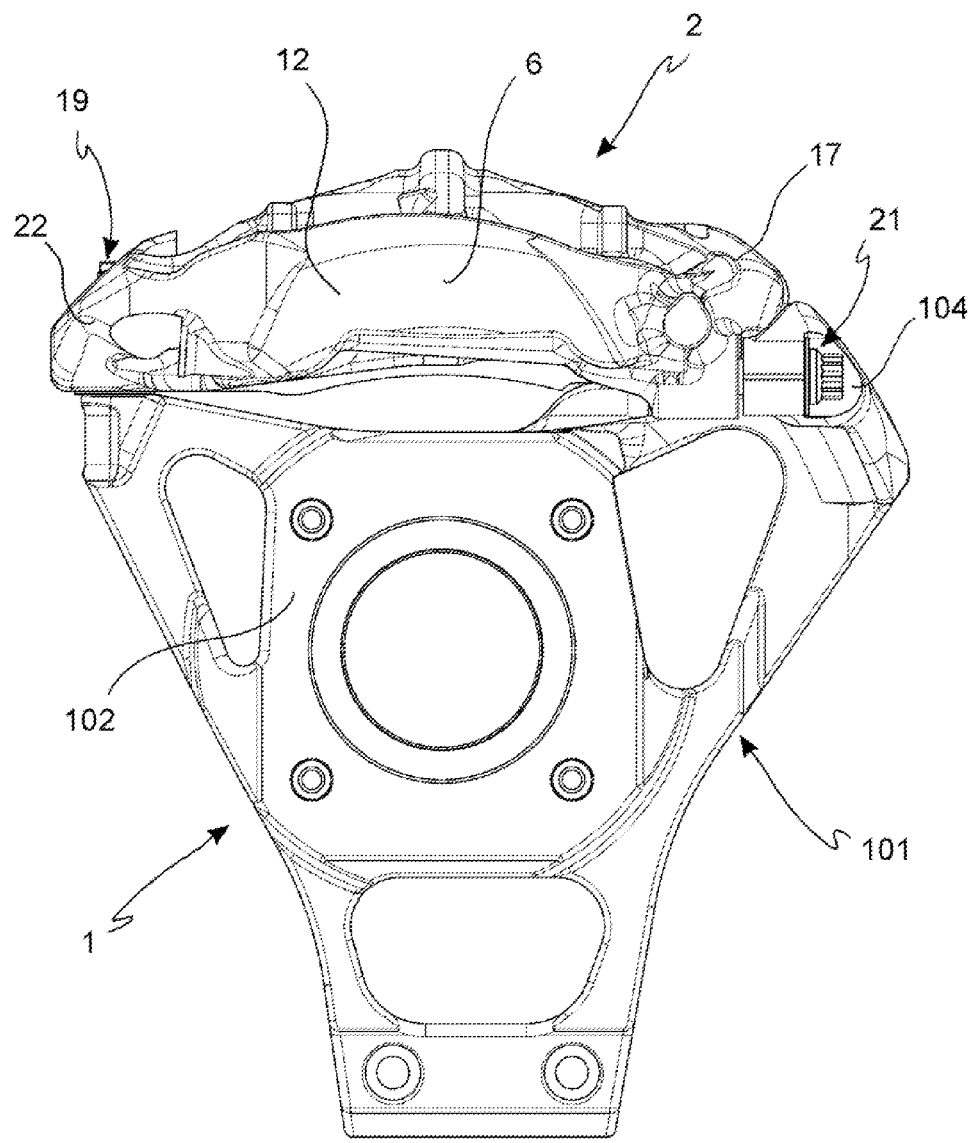
FIG. 3 represents a wheel-side front view of the assembly of FIG. 1.
Figure 4:
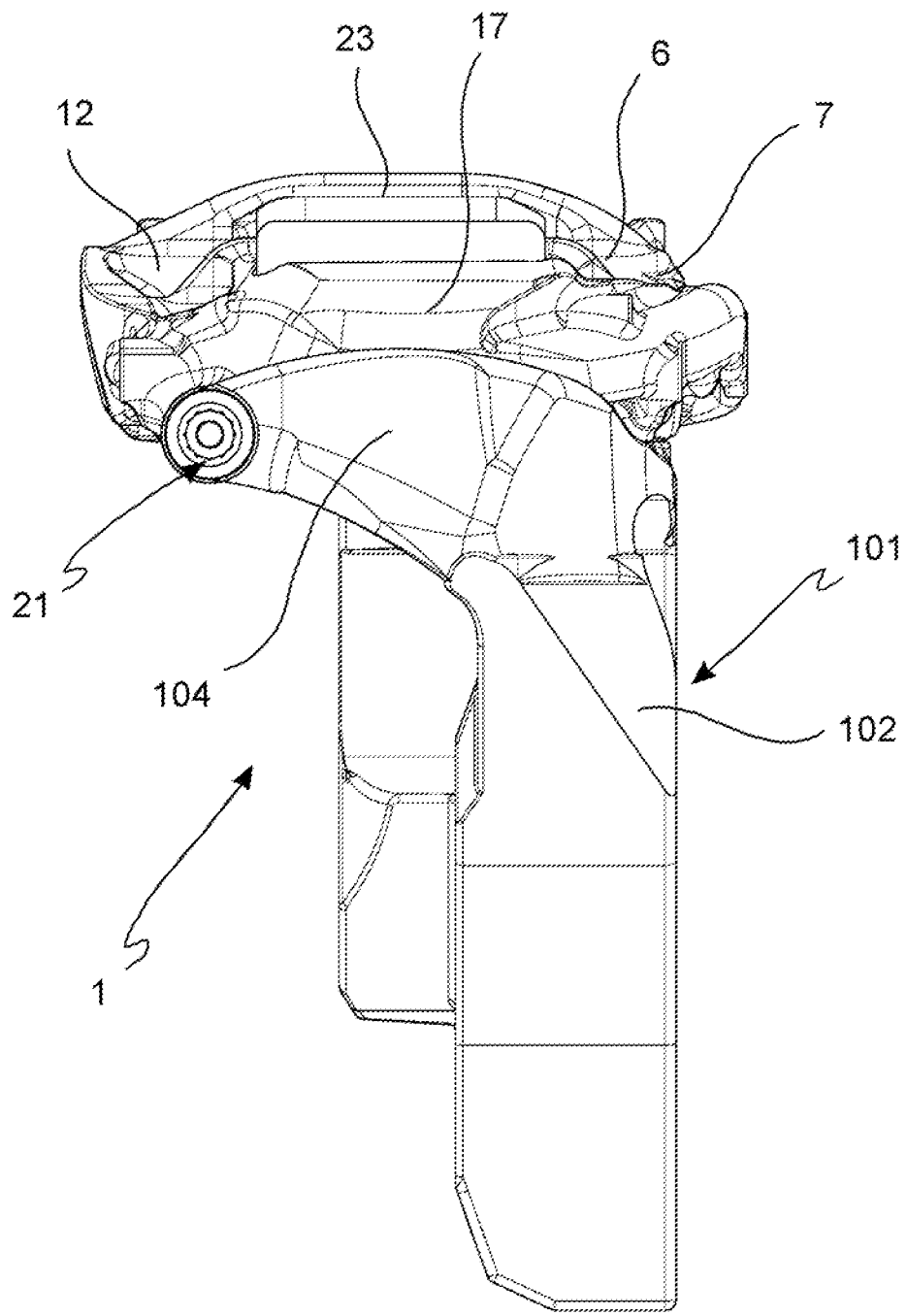
FIG. 4 represents a disc entry-side side view of the assembly of FIG. 1.
Figure 5:
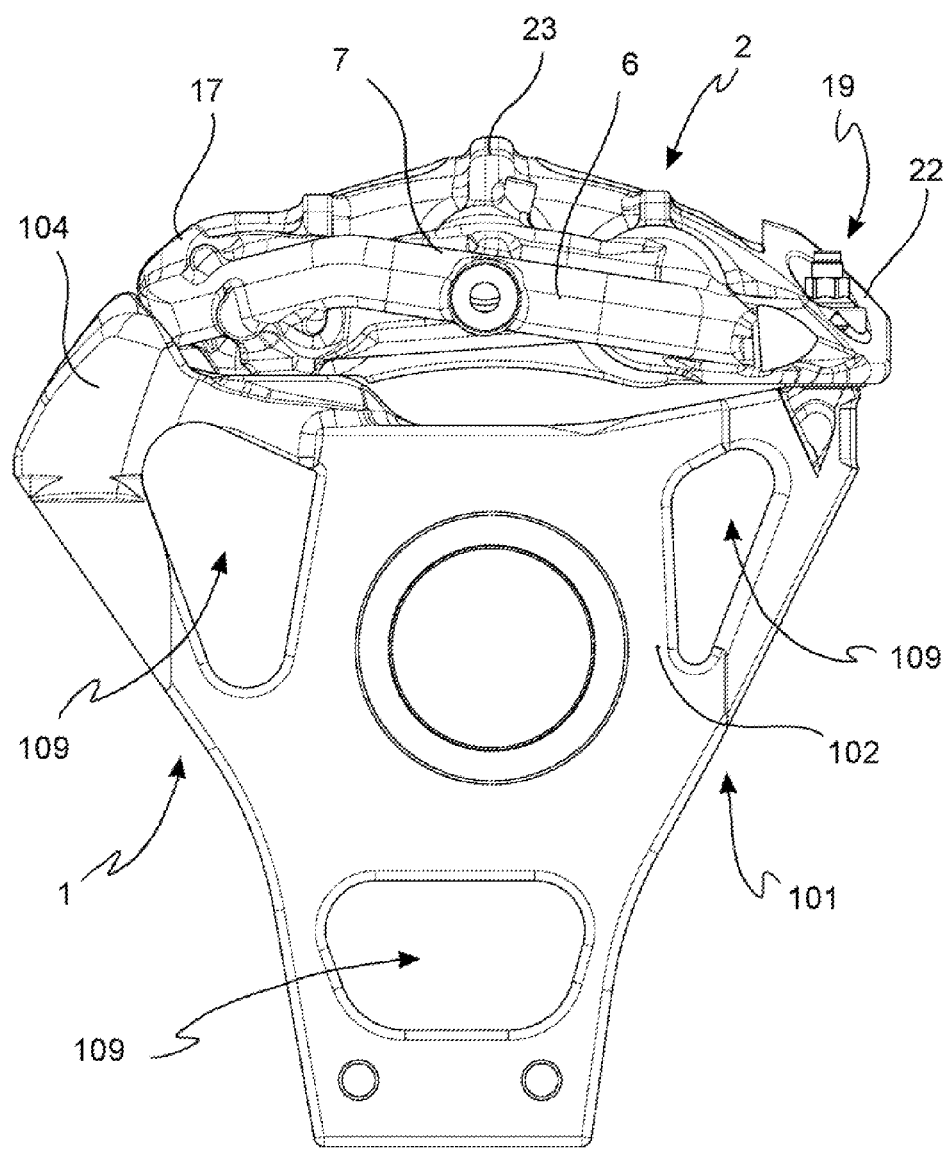
FIG. 5 represents a vehicle-side front view of the assembly of FIG. 1.
Figure 6:
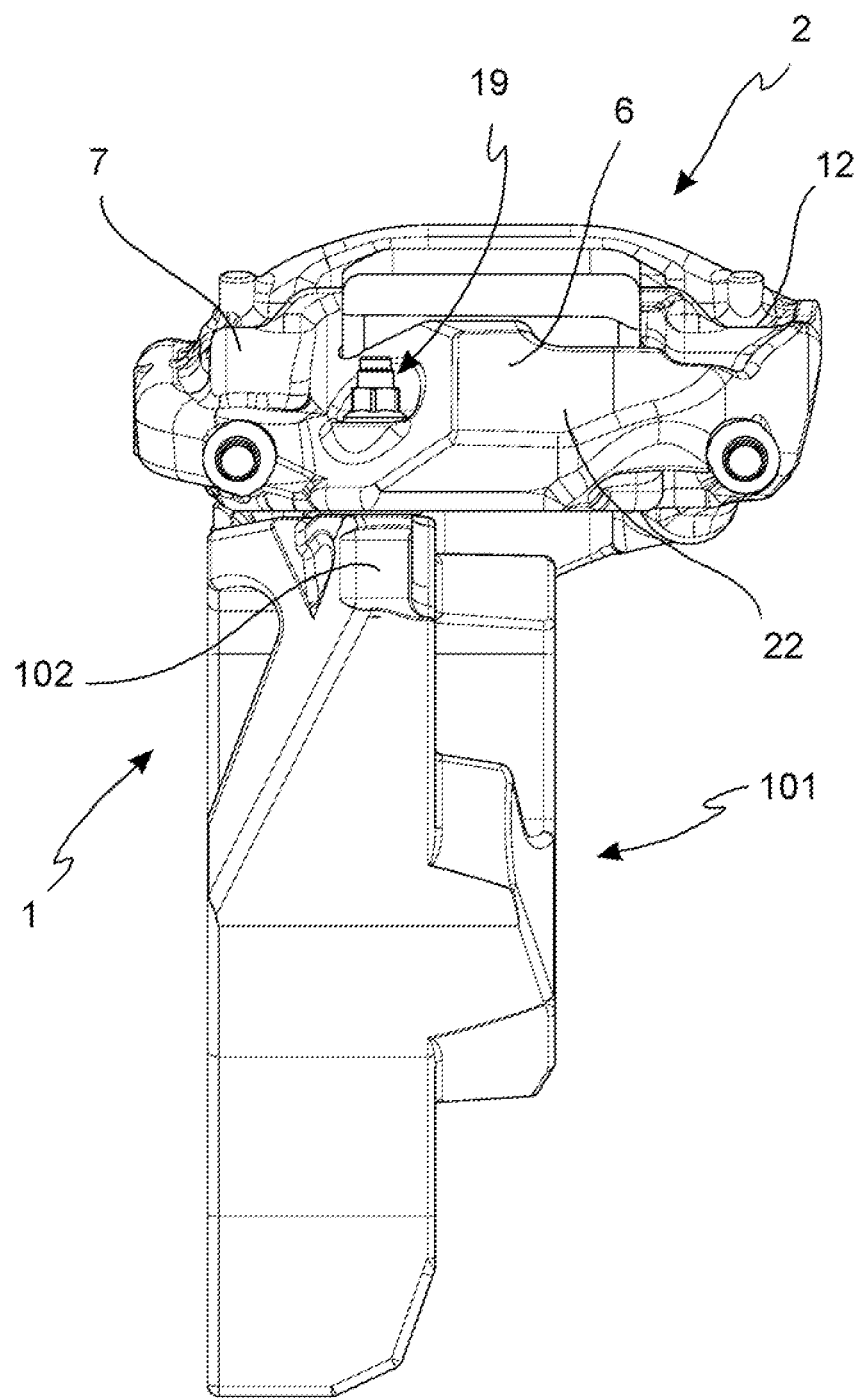
FIG. 6 represents a disc exit-side side view of the assembly of FIG. 1.
Figure 7:
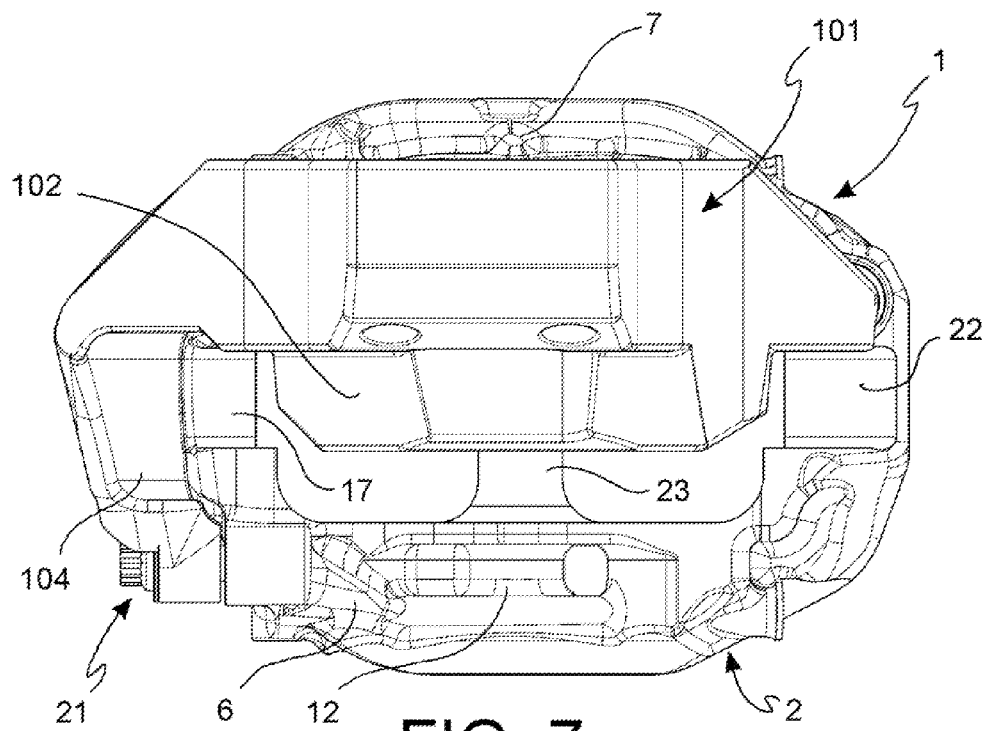
FIG. 7 represents a radial view from the hub bracket towards the fixed caliper of the assembly of FIG. 1.
Figure 8:
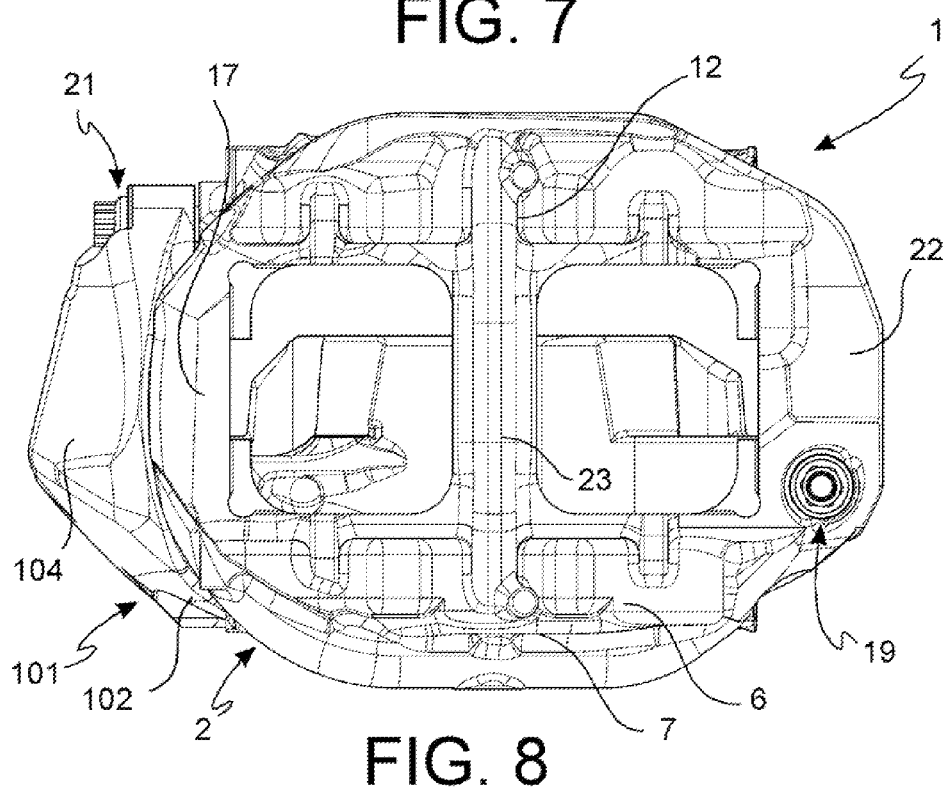
FIG. 8 represents a radial view from the fixed caliper towards the hub bracket of the assembly of FIG. 1.
Figure 9:
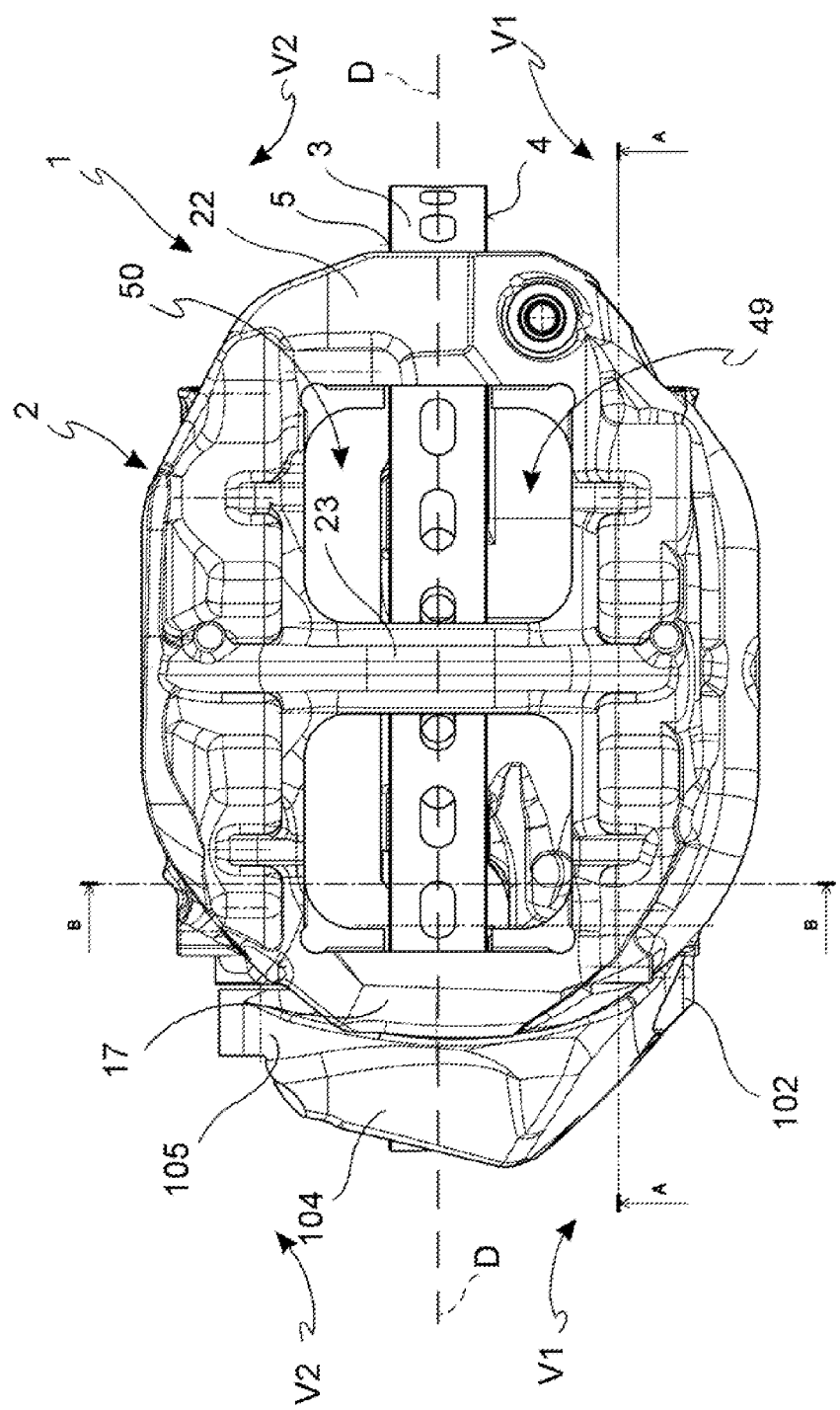
FIG. 9 represents an assembly of a fixed caliper and a support thereof, or hub bracket, and a disc for a disc brake.
Figure 10:
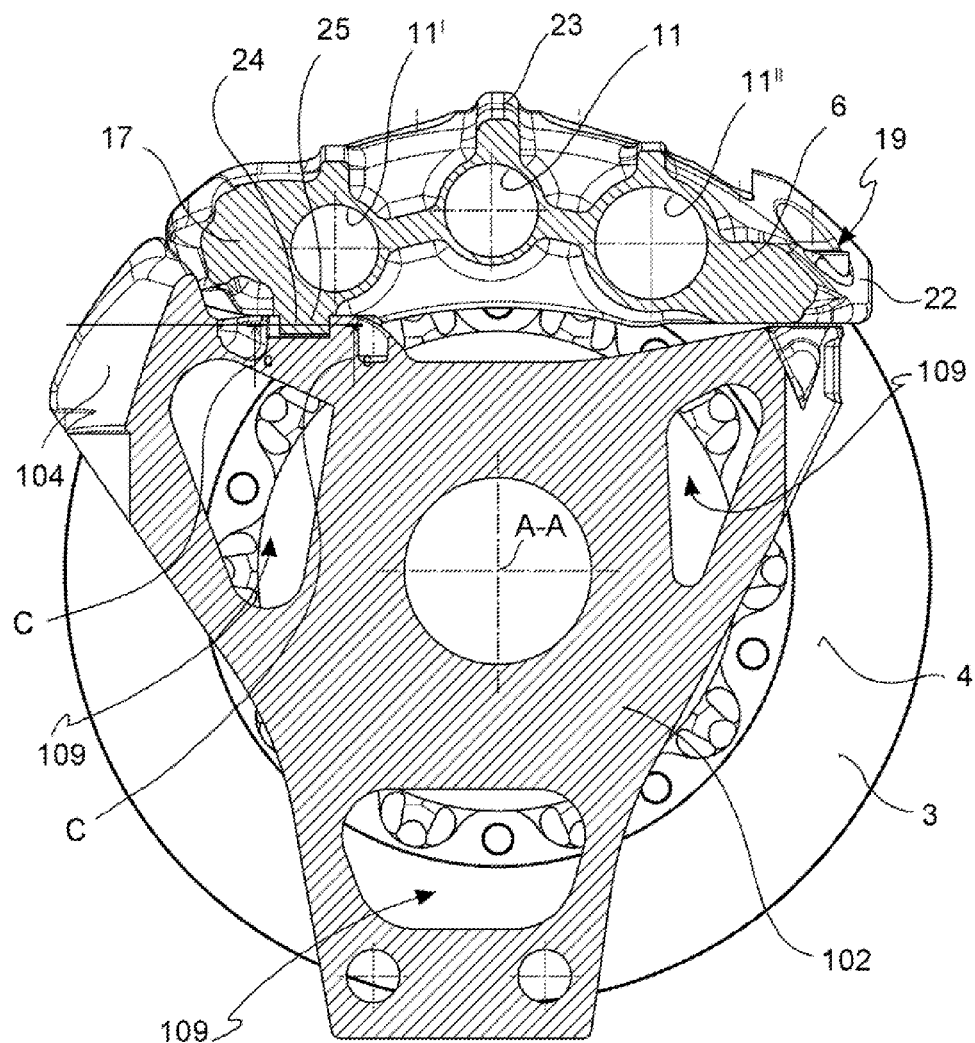
FIG. 10 represents a section according to the line of arrows A-A of FIG. 9.
Figure 11:
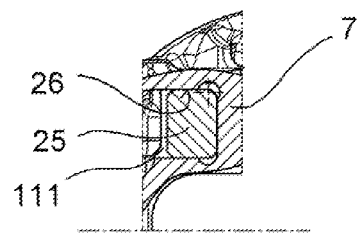
FIG. 11 represents a local section of the assembly of FIG. 9 according to the section indicated with arrows C-C of FIG. 10.
Figure 12:
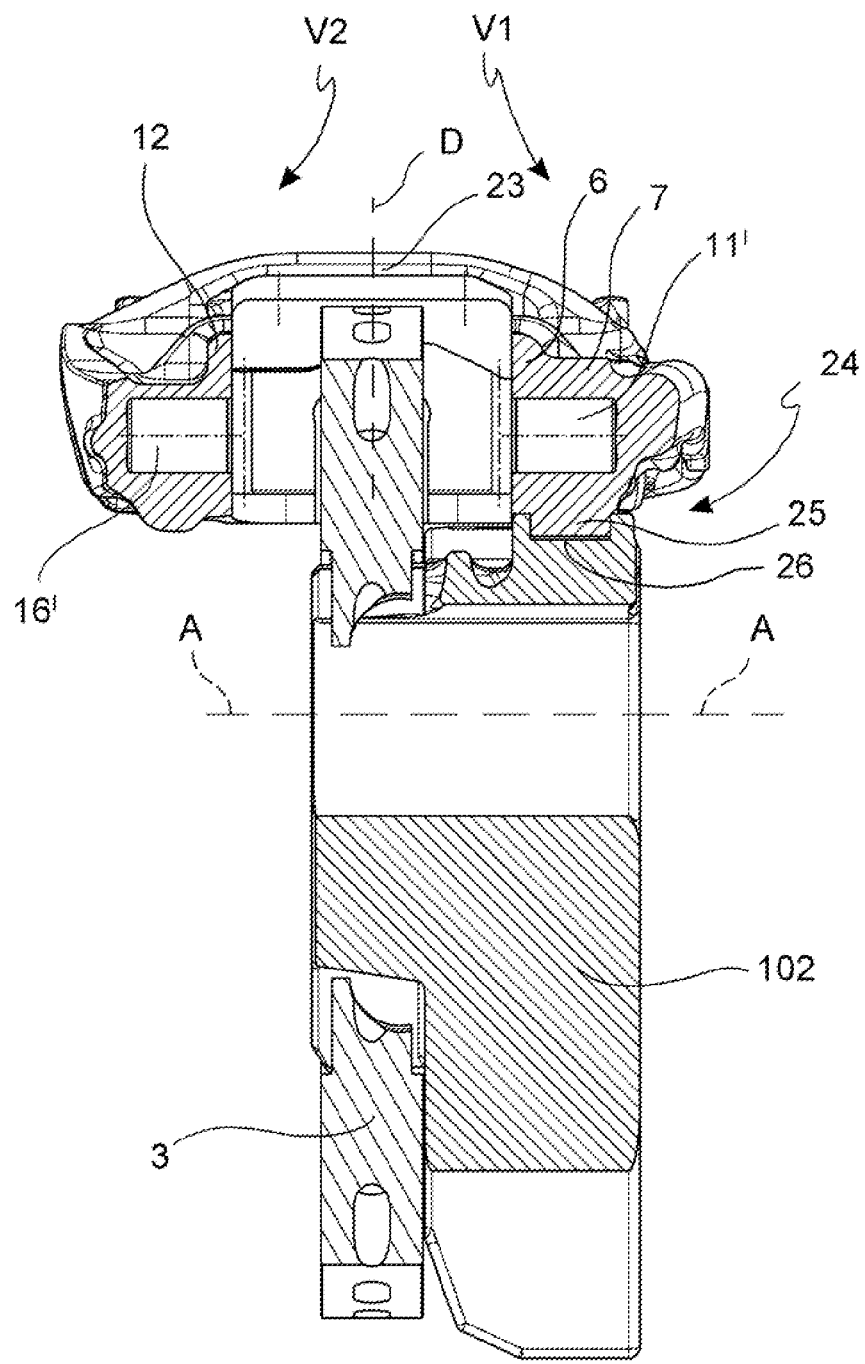
FIG. 12 represents a section of the assembly of FIG. 9 according to the section line indicated with arrows B-B.
Figure 13:
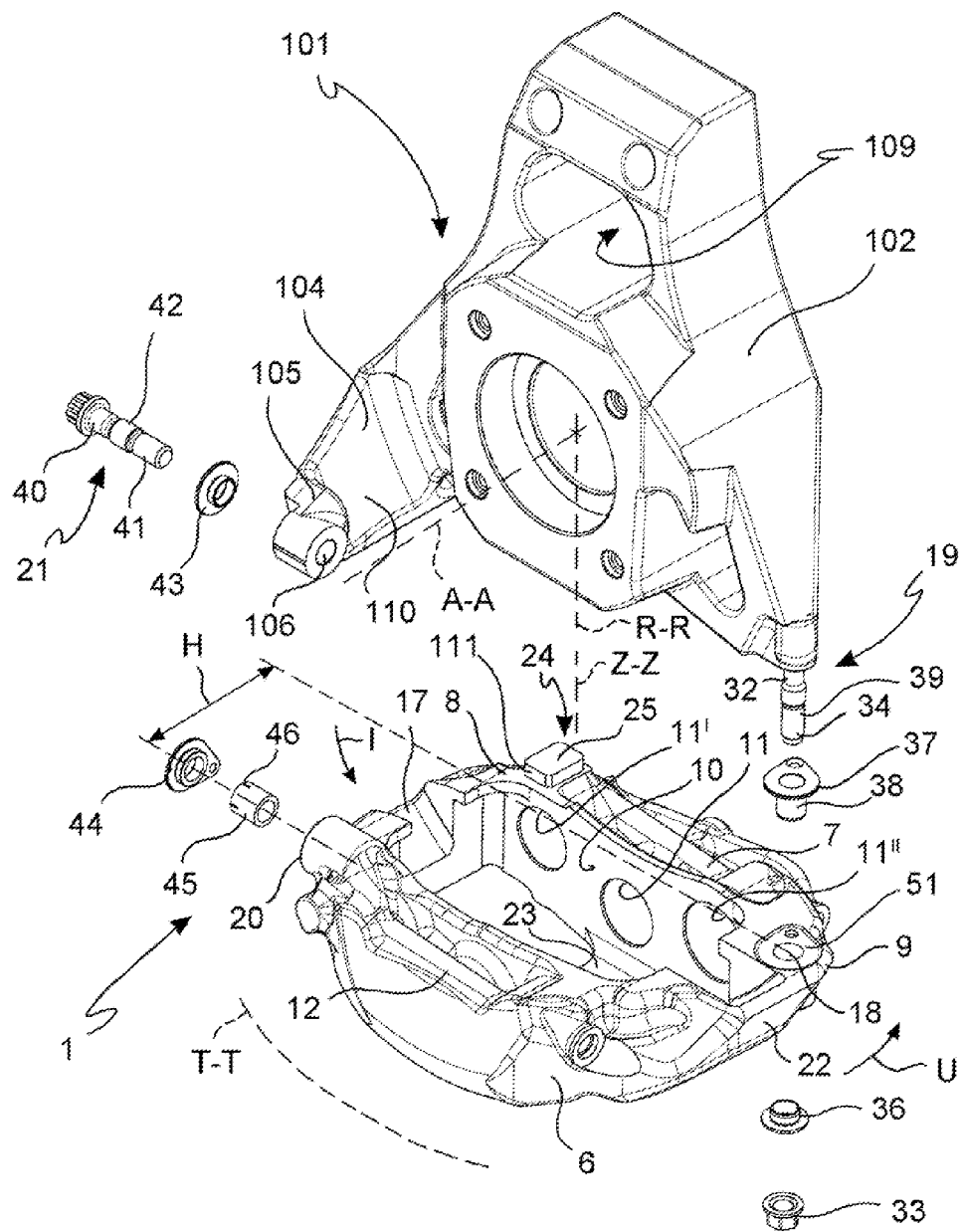
FIG. 13 represents an exploded axonometric view, or with separated parts, of an assembly comprising a fixed caliper, its support, or hub bracket, and the connection means in a wheel-side view.
Figure 14:
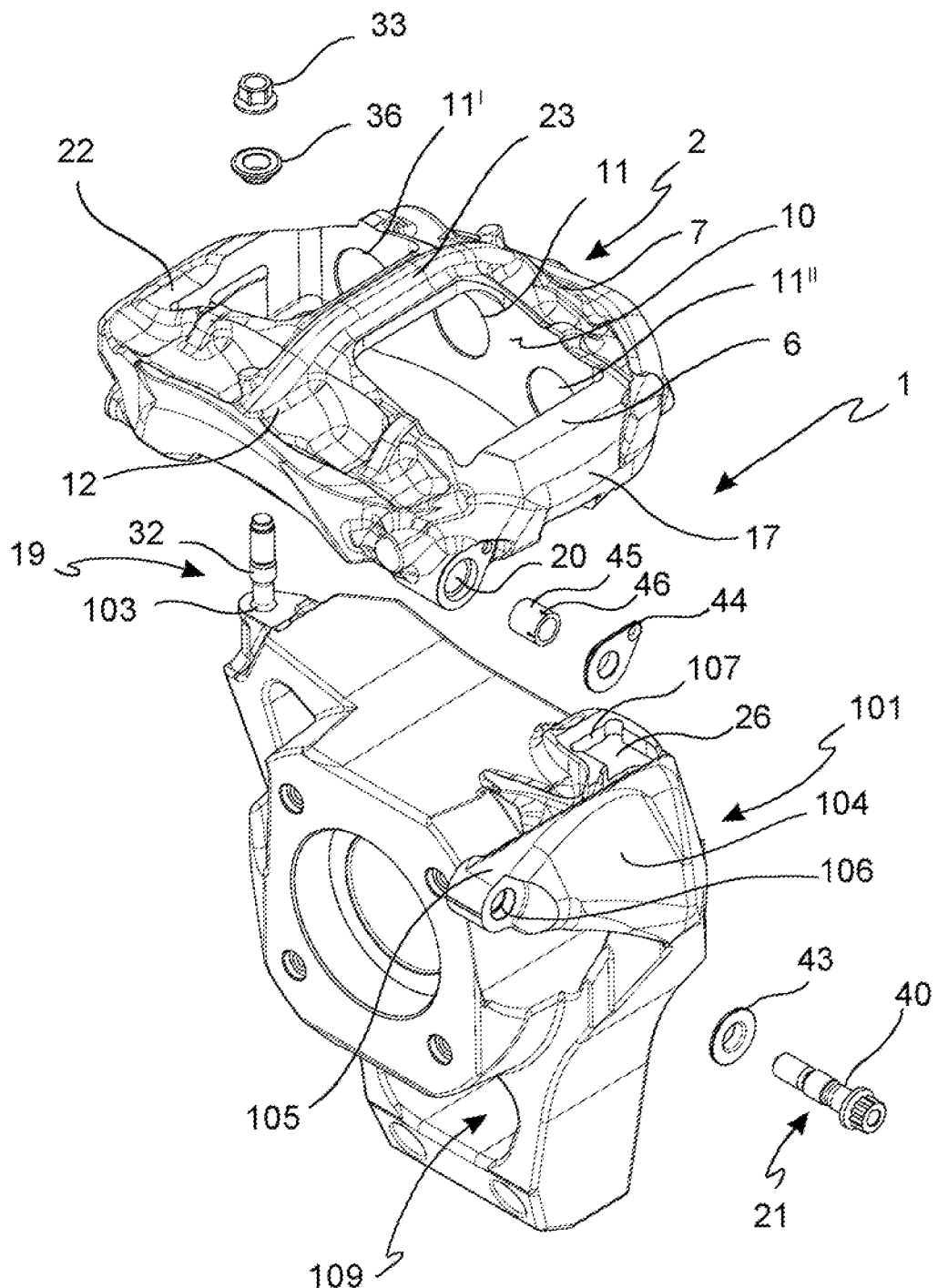
FIG. 14 represents an axonometric view with separated parts of the assembly of FIG. 13 in a wheel-side view and inverted with respect to FIG. 13.
Figure 15:
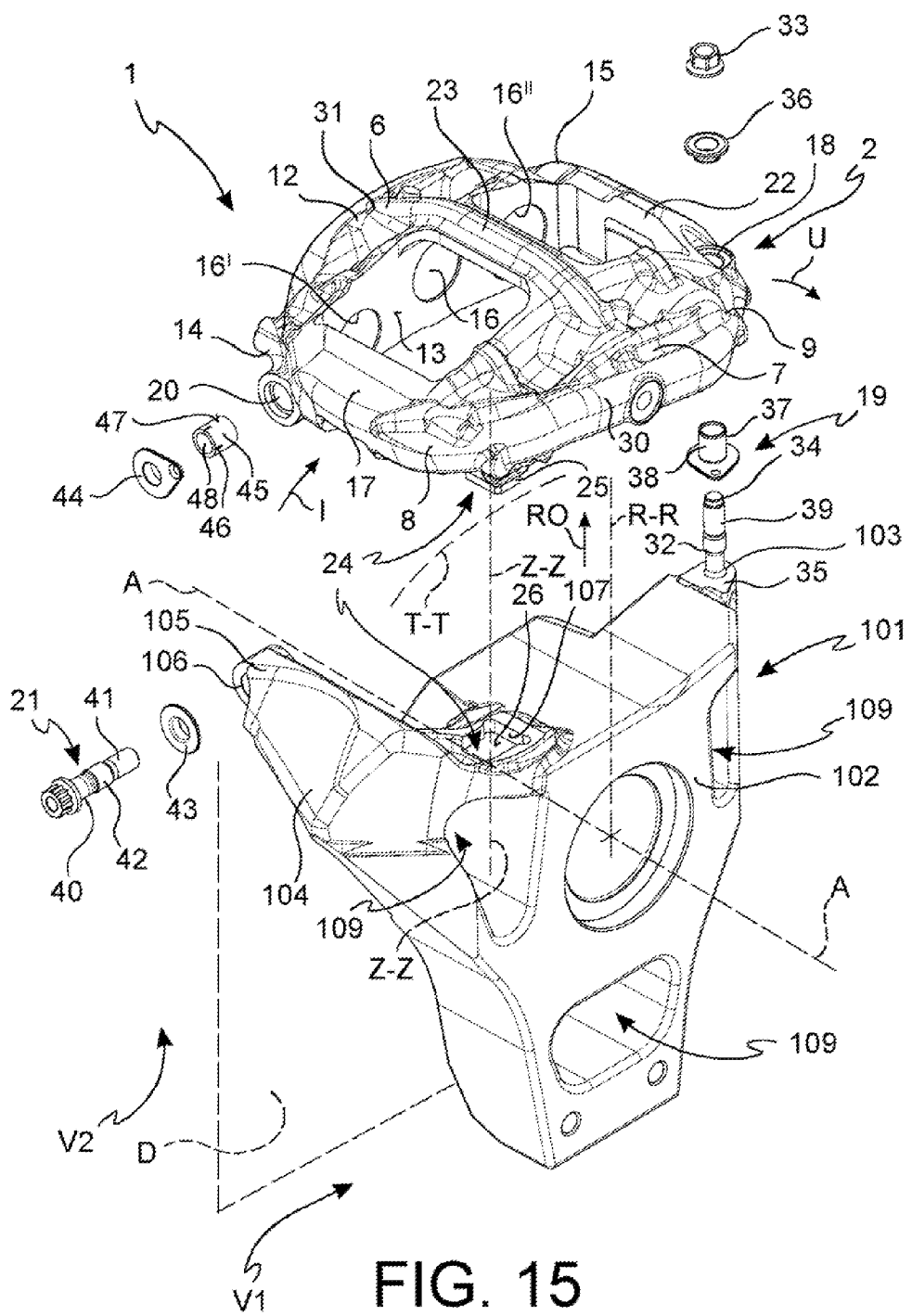
FIG. 15 represents an axonometric view with separated parts of the assembly of FIG. 13 in a vehicle-side view.
Figure 16:
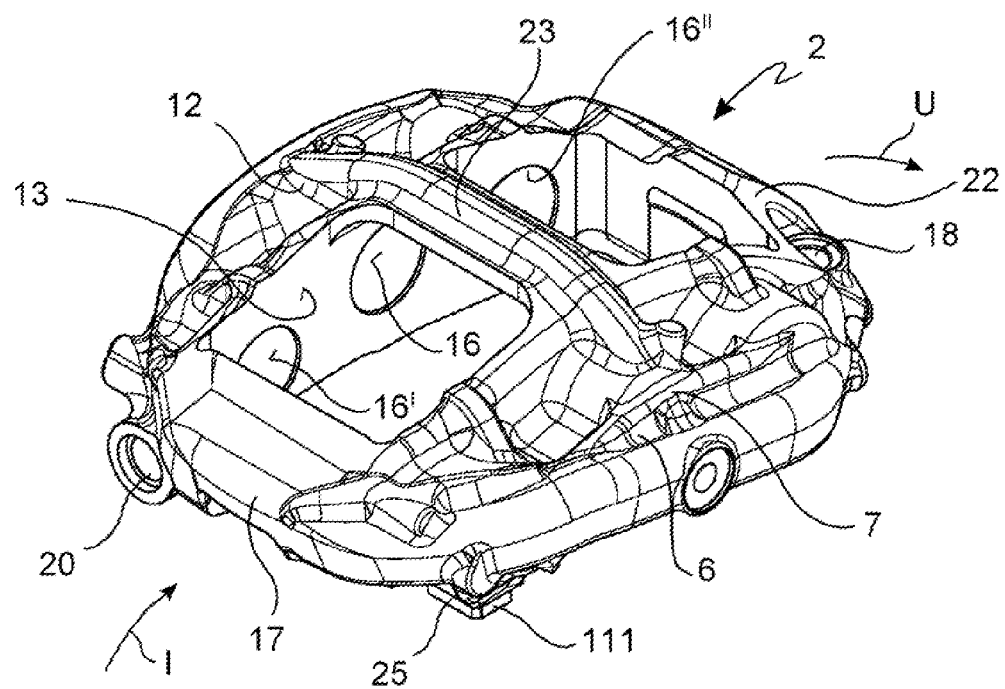
FIG. 16 represents a caliper body for a disc brake in a disc-entry-side-vehicle-side axonometric view.
Figure 17:
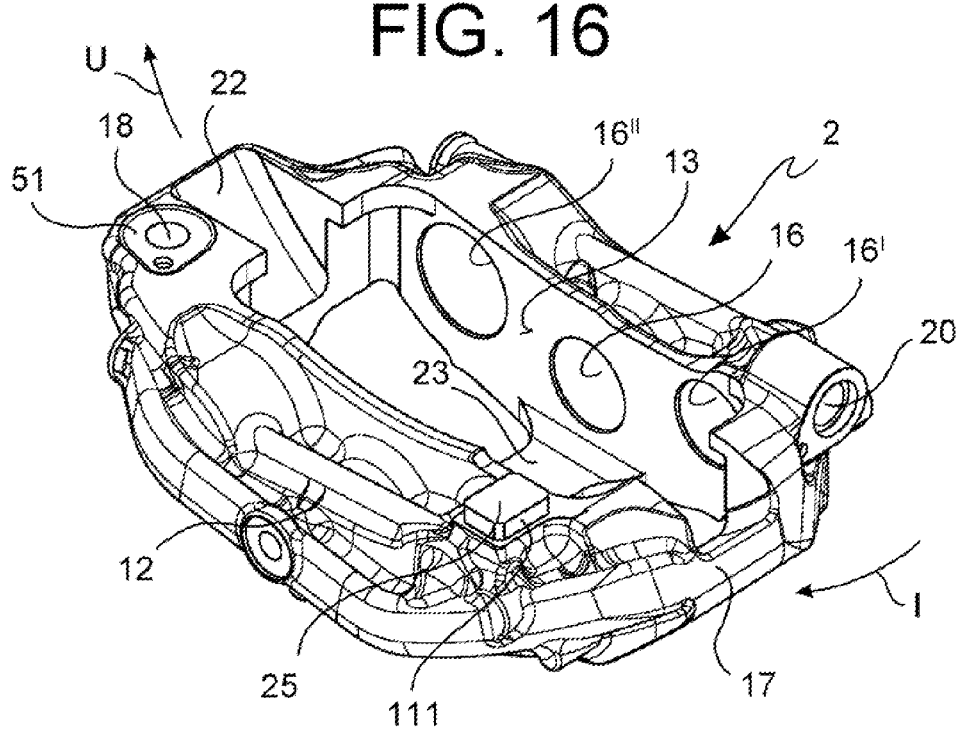
FIG. 17 represents an axonometric view of the caliper body of FIG. 16 from the vehicle-side-disc entry-side, inverted with respect to FIG. 16.
Figure 18:
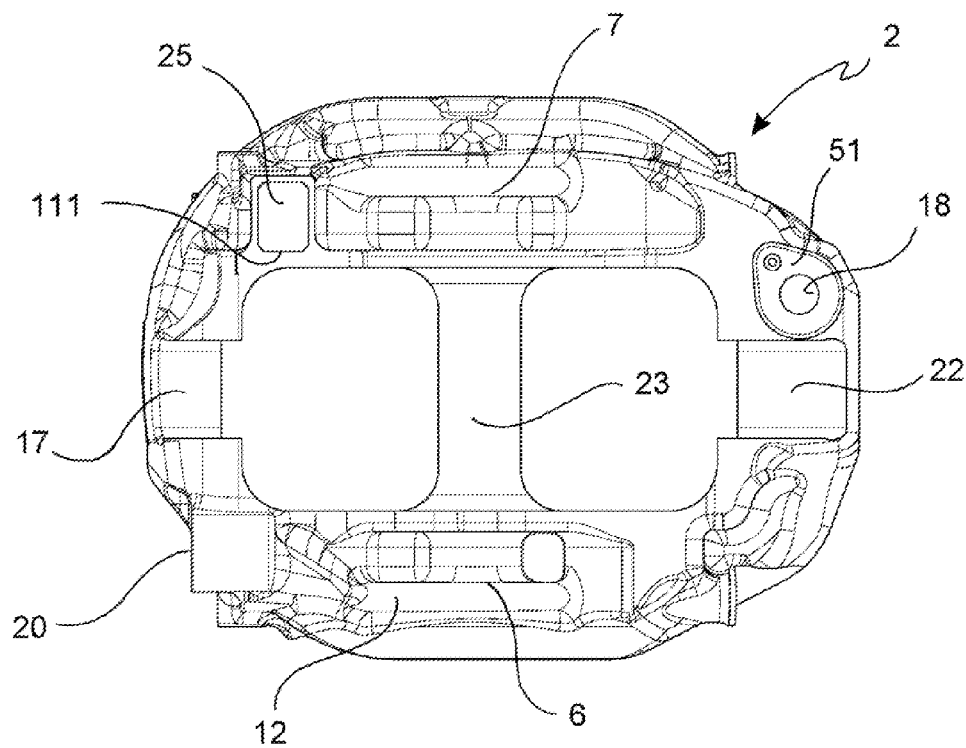
FIG. 18 represents a radial view from the axis of the disc towards the caliper, of the caliper body of FIG. 16.
Figure 19:
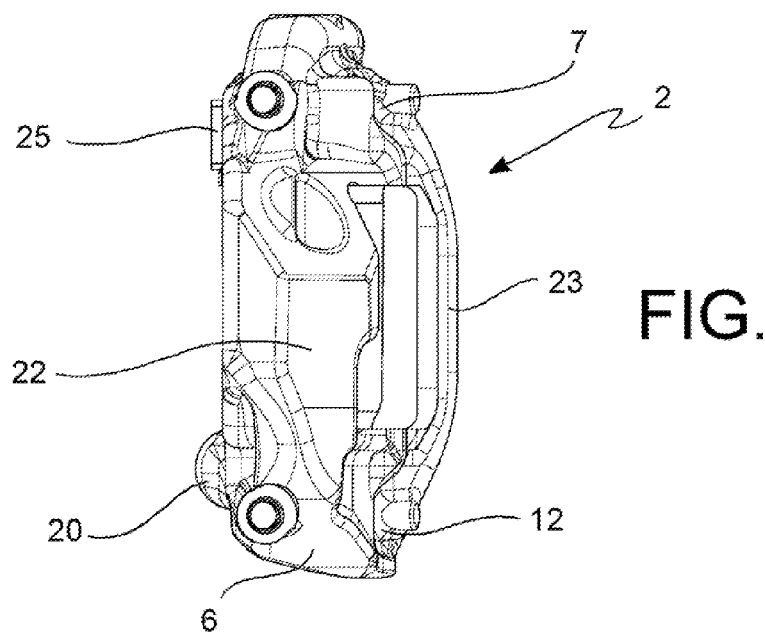
FIG. 19 represents a side view of the caliper body of FIG. 16 from the disc exit side.
Figure 20:
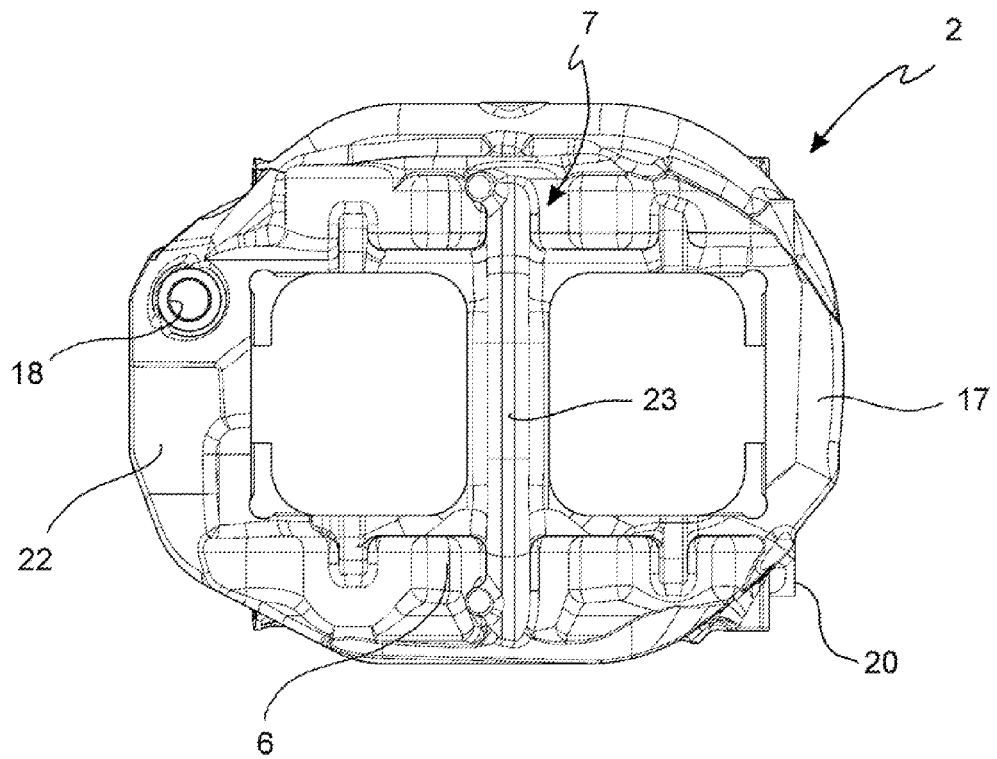
FIG. 20 represents a radial view looking towards the rotation axis of the disc of the caliper body of FIG. 16.
Figure 21:
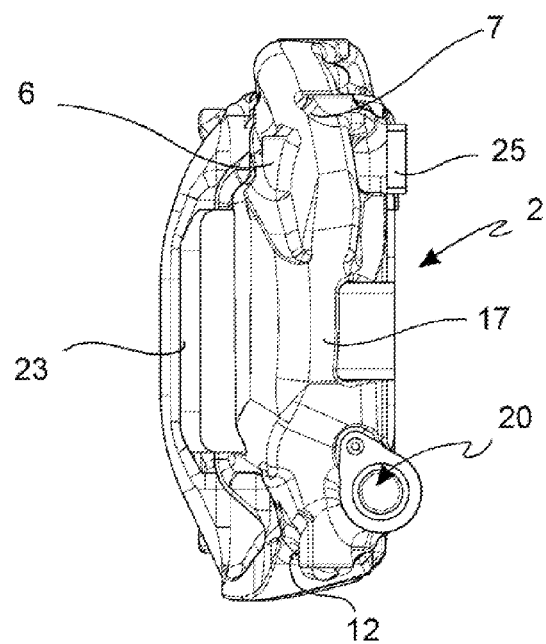
FIG. 21 represents a side view of the caliper body of FIG. 16 from the disc entry side.
Figure 22:
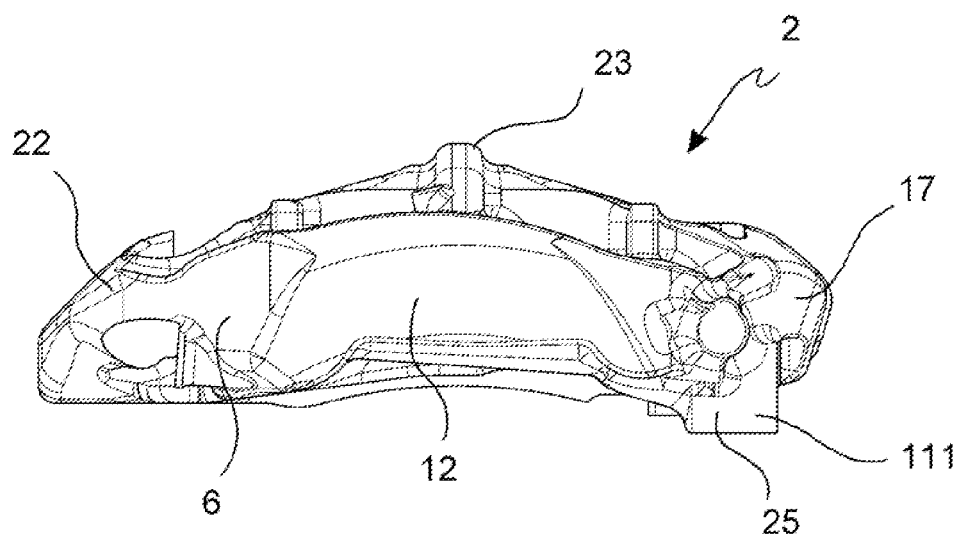
FIG. 22 represents a front view of the caliper body of FIG. 16 from the wheel side.
Figure 23:
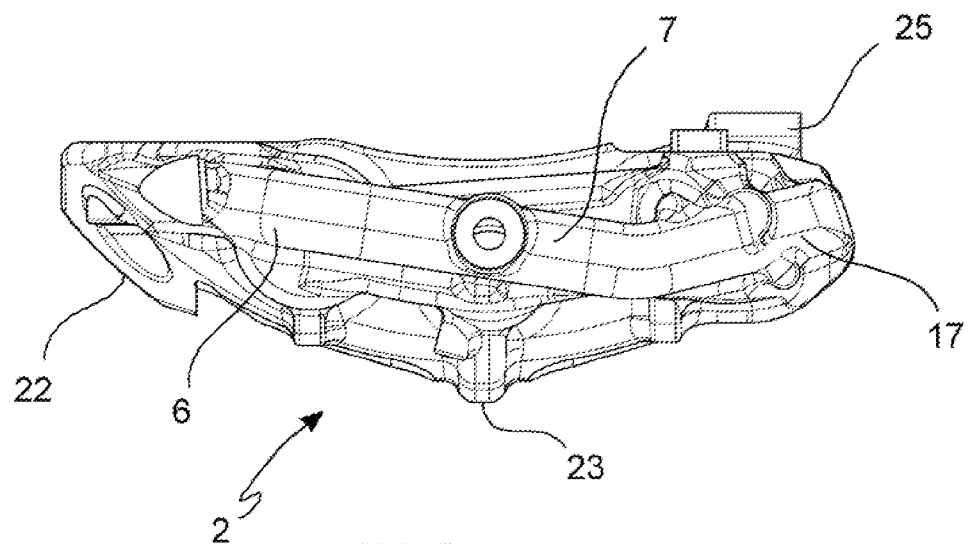
FIG. 23 represents a front view from the vehicle side of the caliper body of FIG. 16.
Figure 24:
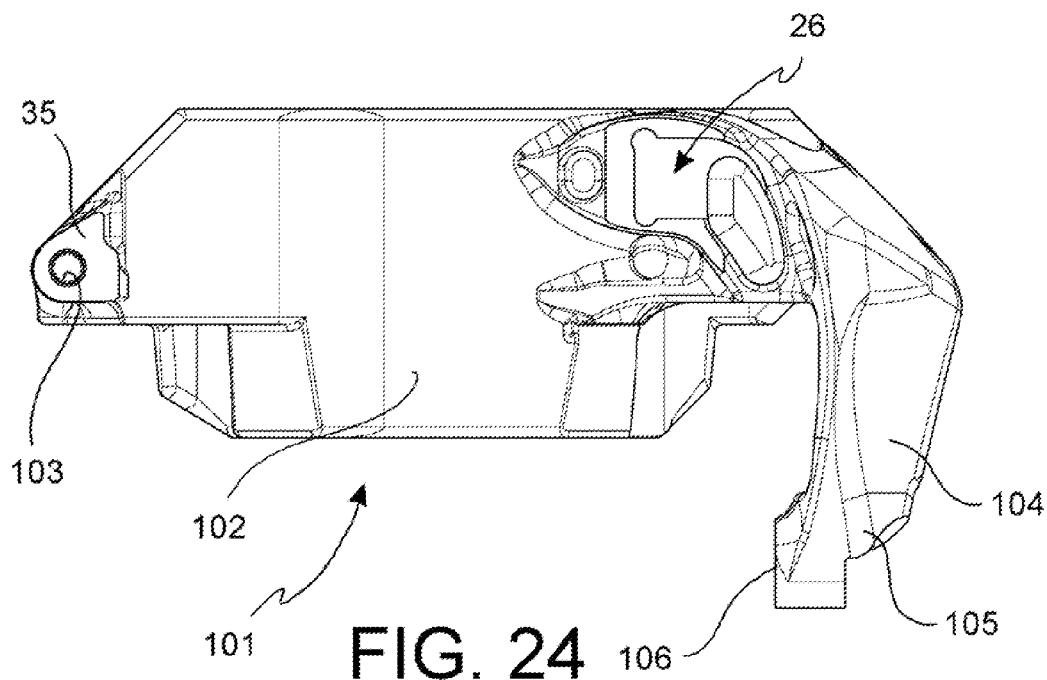
FIG. 24 represents a support for a fixed caliper, or hub bracket, in a radial view looking from the connection means of the caliper towards the axis of the disc.
Figure 25:
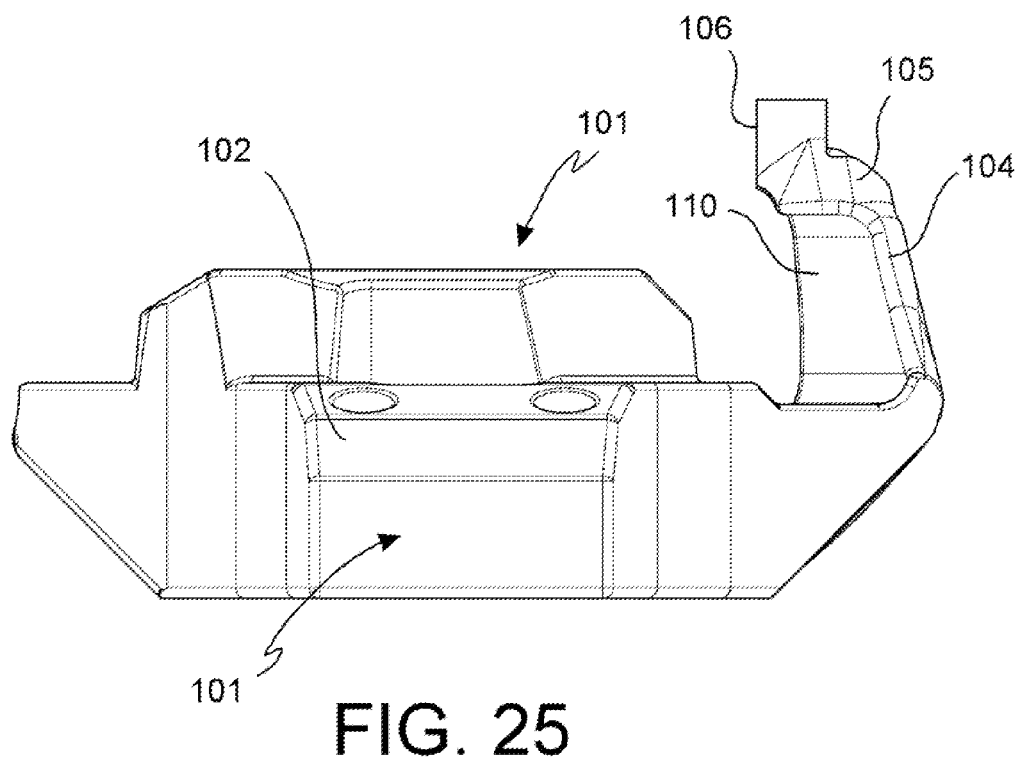
FIG. 25 represents the hub bracket support of FIG. 24 in a radial view from the axis of the disc towards the connection means of the fixed caliper.
Figure 26:
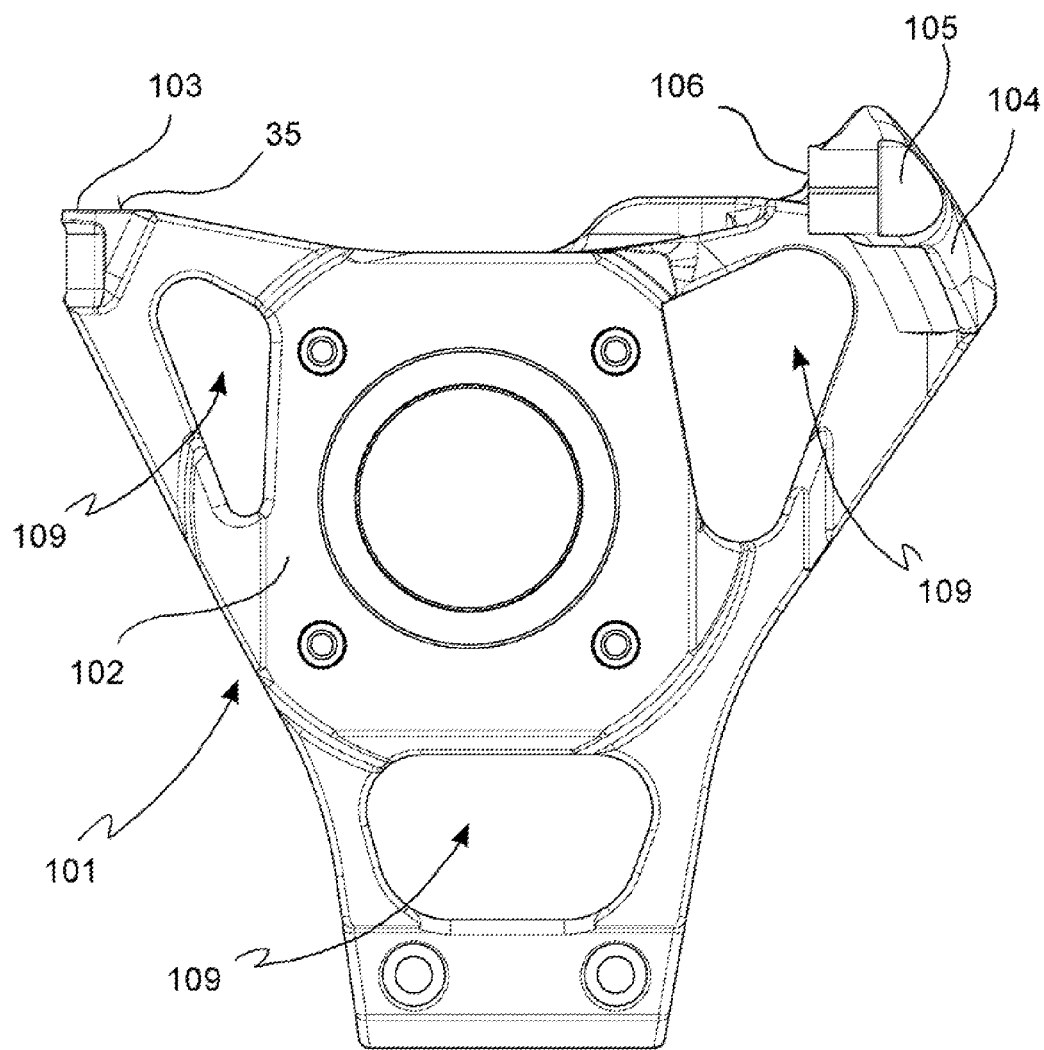
FIG. 26 represents a wheel-side front view of the support, or hub bracket, of FIG. 24.
Figure 27:
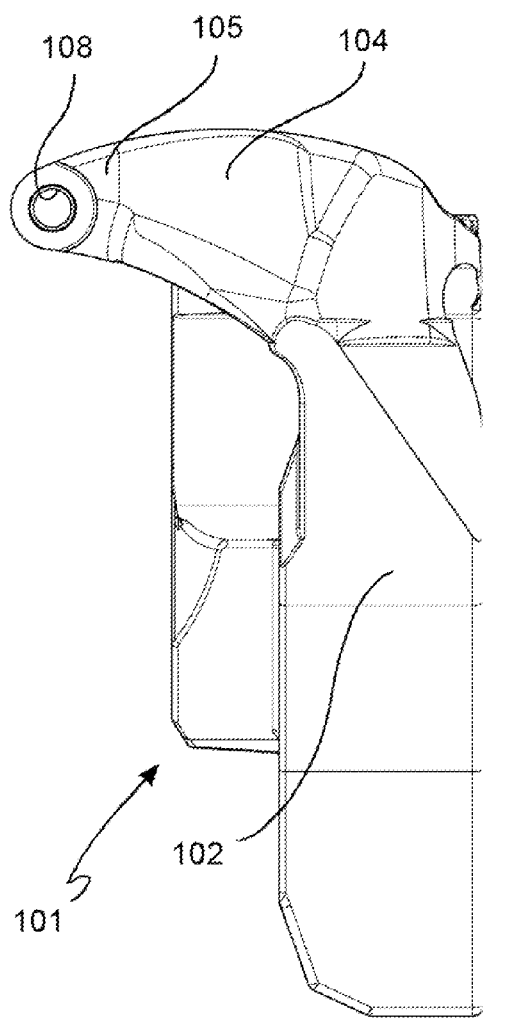
FIG. 27 represents a side view of the support, or hub bracket, of FIG. 24 according to a disc entry-side view.
Figure 28:
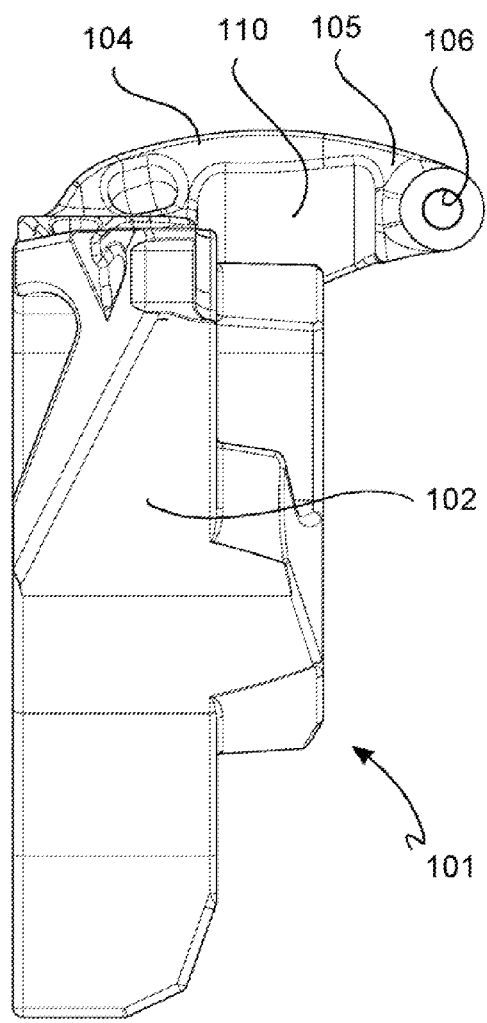
FIG. 28 represents a side view of the support, or hub bracket, of FIG. 24 in a disc exit side view.
Figure 29:
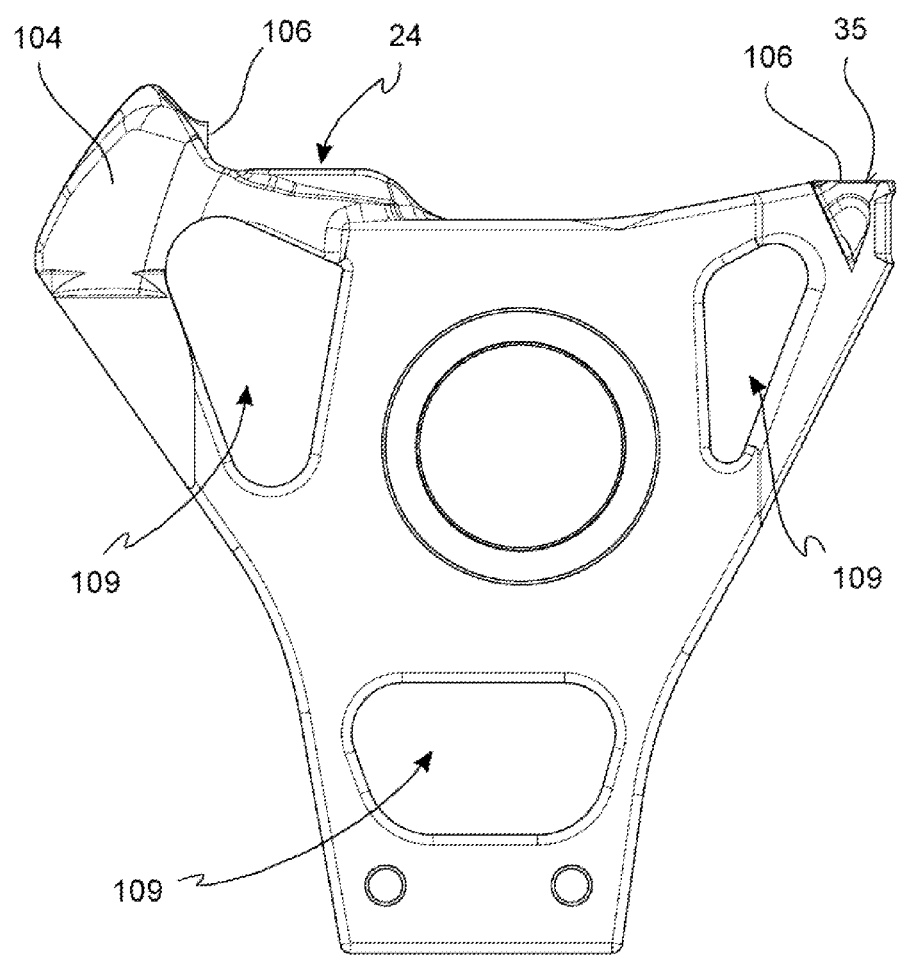
FIG. 29 represents the support, or hub bracket, of FIG. 24 in a vehicle-side front view.

In accordance with a general embodiment, some examples of which are depicted in the attached figures, an assembly 1 of a fixed caliper 2 and hub bracket 101 of a disc brake comprises a fixed caliper, wholly indicated in the figures with reference numeral 2, suitable for being arranged astride of a disc 3 for a disc brake.

Said disc 3 has a first braking surface 4, for example the braking surface of the disc 3 facing towards the vehicle, and a second braking surface 5 opposite the first for example the braking surface facing towards the wheel rim. Said disc 3 defines an axial direction parallel to a rotation axis A-A thereof, as well as a tangential or circumferential direction T-T arranged parallel to one of its braking surfaces 4, 5, preferably with disc entry direction, indicated in the figures with the arrow "I", and disc exit direction, indicated in the figures with the arrow "U", and also a radial direction R-R arranged perpendicular to the axial direction A-A and to the circumferential or tangential direction T-T. The radial direction R-R defines an outer radial direction, indicated with the figures with the arrow RO when facing away from the rotation axis of the disc A-A. Said disc 3, with its plane D for example passing through its middle and transversally to its rotation axis A-A, defines a first volume, a vehicle-side volume V1 that comprises the space that from the plane D containing the disc 3 proceeds towards the vehicle, as well as a wheel-side volume V2 that comprises the space that from the plane D containing the disc goes away from the vehicle.

In accordance with an embodiment, said fixed caliper 2 comprises a caliper body 6, said caliper body 6 has a first vehicle-side elongated portion 7, i.e. a portion of the caliper body 6 that is intended for a prevalent part thereof to face the first braking surface 4 of the disc 3. Said vehicle-side elongated portion 7 comprises a first disc entry-side end 8 in the tangential direction, as well as a second disc exit-side end 9 in the tangential direction. Said vehicle-side elongated portion 7 is suitable for facing an axial inner surface 10 thereof towards the first braking surface 4 of the disc 3. Said first vehicle-side elongated portion 7 houses at least one cylinder 11 suitable for receiving a piston to exert a pressure on at least one pad housed in a gap 49 between this vehicle-side elongated portion 7 of the caliper body 6 and the braking surface 4 of the disc 3, in order to exert the desired braking action.

In accordance with an embodiment, advantageously, the first vehicle-side elongated portion 7 houses a plurality of cylinders 11 suitable for receiving a plurality of pistons to exert a pressure on one or more side-by-side pads housed between said vehicle-side elongated portions 7 of the caliper body 6 and the braking surface 4 of the disc 3, said cylinders being indicated in the figures with reference numerals 11, 11' and 11".

For example, but not necessarily, in the case of applications on sports automobiles the caliper body 6 comprises, in the vehicle-side elongated body 7, three side-by-side cylinders 11, 11' and 11", preferably, but not necessarily, of different diameter, preferably but not necessarily, with increasing diameter going from the disc entry end 8 to the disc exit end 9.

In accordance with an embodiment said caliper body 6 also comprises a second wheel-side elongated portion 12 suitable for being arranged substantially facing for a prevalent part thereof towards the braking surface 5 of the disc 3 facing towards the wheel rim. For example, said second wheel-side elongated portion 12 faces an axial inner surface 13 thereof towards the second braking surface 5 of the disc 3. Said second wheel-side elongated portion 12 comprises a first disc entry-side tangential end 14 and a second disc exit-side tangential end 15. In accordance with an embodiment, said second wheel-side elongated portion 12 houses at least one cylinder 16 suitable for receiving a piston to exert a pressure on a pad, opposite the previous one, housed in a gap 50 between said second wheel-side elongated portion 12 of the caliper body 6 and said second braking surface 5 of the disc 3. In accordance with an embodiment, said second wheel-side elongated portion 12 houses a plurality of cylinders for example arranged beside one another. For example, but not necessarily, in the case in which the fixed caliper is for use in sports vehicles, said second wheel-side elongated portion 12 houses a plurality of cylinders, for example but not necessarily 3 cylinders indicated in the figures with reference numerals 16, 16' and 16", suitable for receiving a plurality of pistons to exert a pressure on a pad or a plurality of side-by-side pads housed between said second wheel-side elongated portion 12 of the caliper body 6 and said second braking surface 5 of the disc 3 to exert the desired braking action.

In accordance with an embodiment, said first and said second vehicle-side and wheel-side elongated portion 7, 12, are connected together by at least one bridge 17 arranged astride of the disc 3. Said bridge 17 firmly connects said first vehicle-side elongated portion 7 to said second wheel-side elongated portion 12, so as to prevent their relative movements and limit the deformation of the caliper body 6 when subject to braking action.

In accordance with an embodiment said at least one bridge 17 connects the disc entry ends 8, 14 of said first vehicle-side elongated portion 7 and said second wheel-side elongated portion 12.

In accordance with an embodiment, said first vehicle-side elongated portion 7 is connected to said second wheel-side elongated portion 12 through a second bridge 22 arranged astride of the disc 3 and suitable for firmly connecting the disc exit ends 9, 15 of said first and second vehicle-side and wheel-side elongated portions 7, 12.

In accordance with a further embodiment, said caliper body 6 foresees a third bridge 23 arranged astride of the disc 3 connecting the central sections 30, 31 of said first vehicle-side elongated portion 7 and said second wheel-side elongated portion 12.

In accordance with an embodiment, said caliper body 6 also comprises at least one first seat 18 to receive a first connection element 19 intended to connect said fixed caliper 2 to said hub bracket 101. In accordance with an embodiment, said first connection element 19 is a stud bolt 32 firmly fixed to the hub bracket 101. In accordance with an embodiment said first seat 18 of the caliper body 6 is a through seat suitable for receiving a stem of the stud bolt 32 so as to rest make the caliper body 6 rest firmly on the hub bracket 101 making the end 34 of the stud bolt poke out from the seat 18 of the caliper body 6 so as to receive a connection nut 33 with its free end 34, said nut being suitable for screwing onto said stud bolt 32 and firmly clamping the caliper body 6 resting stably, for example but not necessarily with preload, against an abutment surface 35 foreseen on the hub bracket 101.

In accordance with an embodiment protecting the caliper body, which preferably but not necessarily is made with a light material, like for example, but not necessarily, aluminium or an aluminium alloy, like for example, but not necessarily, aluminium and lithium, some washers 36 and 37 are foreseen that are made from wear-resistant material and are capable of distributing the pressure of the connection element 19, avoiding impressions on the material of the caliper body.

In accordance with an embodiment, said washers 36, 37 are made from steel or for example, but not necessarily, titanium coated with PVD (TiN) or with a layer obtained by nitriding.

In accordance with an embodiment the washer that goes between the caliper body 6 and the hub bracket 101 comprises an extension able to be connected, for example but not necessarily with screw means, to the body of the hub bracket 102 so that when the caliper body 6 is separated from the hub bracket 101 the washer 37 is firmly fixed on the body of the caliper 6 preventing it from being lost or having to be replaced. This provision is particularly suitable above all when this solution is used in sports vehicles and the maintenance of the vehicle, with for example the dismounting and remounting of the components of the assembly 1, takes place in very short time periods, when it is necessary to take steps to prevent the small components, such as the washers, from falling and having to be replaced or having to be held in position in a complex manner during mounting.

In accordance with an embodiment, at least one of the two washers 36, 37, preferably the washer with a stop fixed to the caliper body 6, has a portion of body that extends inside the first seat 18 protecting it. In accordance with an embodiment, at least one of the washers equipped with extension suitable for inserting in the first seat 18 is slotted in the first seat 18 taking its extension 38 into close contact with the surfaces of the first seat 18 limiting the clearances as much as possible. In accordance with an embodiment, the stud bolt 32 has a section of its shank of a size calibrated to be tightly slotted in contact with the extension 38 of the washer 37, limiting the clearances in the coupling and increasing the firm connection between the caliper body 6 and the hub bracket 101.

Said hub bracket 101 of said assembly 1 makes a support for the fixed caliper 2. Said hub bracket 102 comprises a hub bracket body 102 arranged substantially in the vehicle-side volume V1.

In accordance with an embodiment, said hub bracket body 102 is suitable for being connected to articulated arms of the suspension of the vehicle and/or of the steering of the vehicle. In accordance with an embodiment, said hub bracket body 102 is suitable for housing a bearing to rotatably support a hub able to be connected to said disc 3 and to a wheel of the vehicle, as well as possibly for containing the motion transmission shaft of the vehicle to the wheel.

In accordance with an embodiment said hub bracket body 102 can also comprise windows 109 suitable for allowing cooling air to pass towards the disc 3 and/or towards the caliper body 6.

In accordance with an embodiment, said hub bracket body 102 comprises at least one third seat or disc-exit-side bracket seat 103 to receive said first connection element 19 and firmly connect said first portion elongated at the vehicle side 7 to said hub bracket body 102.

Advantageously, in accordance with an embodiment, said caliper body 6 of said fixed caliper 2 comprises at least one second seat 20 to receive a second connection element 21.

In accordance with an embodiment, said at least one second seat 20 is arranged in said second wheel-side elongated portion 12.

In accordance with an advantageous embodiment, said hub bracket body 102 has an arm 104 that from said hub bracket body 102 extends astride of the disc 3 taking a portion of the arm 105 in said wheel-side volume V2.

Advantageously, in accordance with an embodiment, said portion of the arm arranged on the wheel side 105 has a fourth seat or disc-entry-side bracket seat 106 to receive the second connection element 21 for the connection of the caliper body 6 to the hub bracket body 102.

In accordance with an embodiment, said second connection element 21 comprises, for example but not necessarily, a stud bolt 40 suitable for being received in the fourth seat or disc-entry-side bracket seat 106 of the hub bracket body 102, for example of the type passing right through so that an end section 41 can poke out from the fourth seat or disc-entry-side bracket seat 106 and firmly connect in the second seat 20 of the wheel-side elongated portion 12 of the caliper body 6.

In accordance with an embodiment, said stud bolt 40 screws with its end 41 into a threaded bush 45.

In accordance with an embodiment, said bush 45 is internally threaded, to receive and firmly connect the end 41 of the stud bolt 40 in an inner threaded surface 48 thereof, and threaded in an outer surface 47 thereof to be screwed inside the second seat 20 of the caliper body 6. In this way, the second threaded seat 20 of the caliper body 6 is protected and is less likely to wear down from repeated mounting and dismounting of the stud bolt 40. For this purpose, and in accordance with an embodiment, said bush 45 is made from steel.

In accordance with an embodiment, in order to prevent the bush 45 from unscrewing from the second seat of the caliper body 6, in the outer surface 47 of the bush 45 there is at least one groove 46 transversal to the outer threading suitable for receiving a pin that is forcibly planted in the thread of the second seat 20 of the caliper body 6 constituting an obstacle to the rotation of the bush 45.

In accordance with an embodiment, between said second connection element 21 and the caliper body 6, as well as the hub bracket body 102 washers 43, 44 are arranged, for example but not necessarily anti-wearing and/or capable of preventing said second connection element 21 from wearing or making impressions on the material of the caliper body 6 and/or of the hub bracket body 102.

In accordance with an embodiment, said washers 43, 44 are made from steel or preferably titanium and preferably titanium coated with PVD. In accordance with an embodiment, in order to prevent the washer arranged between the hub bracket body 102 and the caliper body 6 from being able to be lost during the mounting and dismounting of the caliper body 6 on the hub bracket 101 and in order to simplify the mounting operations avoiding an operator having to keep said washer 44 in position, it has an extension thereof able to be firmly connected for example through threaded means to the body of the caliper, so as to remain in position even during the steps of mounting and dismounting the caliper body 6 from the hub bracket 101.

In accordance with an embodiment, said at least one first seat 18 foreseen in the caliper body 6 is arranged near to the disc exit end 9 of the vehicle-side elongated portion 7.

In accordance with an embodiment, said first seat 18 is arranged in a section of the caliper body 6 for joining between the vehicle-side elongated portion 7 and a connection bridge between the elongated portions 7, 12, arranged at the end of the caliper body for connecting the disc exit ends 9, 15 of the elongated portions 7, 12, where in the figures said bridge is indicated with reference numeral 22.

In accordance with an embodiment, said first seat has an extension thereof arranged transversally to the rotation axis A-A, in other words according to a substantially radial direction or parallel to a radial direction R-R.

In accordance with an embodiment said first seat 18 is a through seat. In accordance with an embodiment said first seat 18 is arranged substantially facing in the tangential direction T-T towards the gap to house the at least one first pad arranged between the vehicle-side elongated portion 7 and the disc 3, where in the figures the gap for housing the at least one pad is indicated with reference numeral 49.

In accordance with an embodiment, said first seat 18 is defined on the side facing the hub bracket body 102 by a seat 51 or gap suitable for housing a washer with stop 37 suitable for being arranged between the body of the caliper 6 and an abutment surface 35 of the body of the hub bracket 102.

In accordance with an embodiment, when the caliper body 6 is arranged coupled with said hub bracket 101, said at least one first seat 18 is aligned with said third seat or disc-exit-side bracket seat 103 foreseen in the body of the hub bracket 102. In accordance with an embodiment, the first connection element 19 comprises a stud bolt 32 screwed into said third seat or disc-exit-side bracket seat 103 of the hub bracket body 102 projecting with a shank section 34 thereof so as to be inserted in the first seat 18 and poking out from the caliper body 6 on the opposite side with respect to the body of the hub bracket 102 with an end shank portion 34 suitable for being connected with a lock nut 33, for example but not necessarily interposing a washer 36.

In accordance with an embodiment, said hub bracket body 102 has a single arm 104 extending astride of the disc 3.

Advantageously, in accordance with an embodiment said arm 104 is arranged substantially facing the disc entry end 8, 14 of said first vehicle-side elongated portion 7 and said second wheel-side elongated portion 12.

In accordance with an embodiment, said arm 104 is arranged substantially parallel to a bridge 17 for connecting the disc entry end 8, 14 of said first vehicle-side elongated portion 7 and said second wheel-side elongated portion 12.

In accordance with an embodiment, said arm 104, in its portion arranged astride of the disc, has a groove 110 suitable for receiving a peripheral portion of the disc 3 so that the surfaces of said groove 110 face an end portion of the braking surfaces 4, 5 and a radially outer edge of the disc 3. In this way, it is possible to reduce the radial bulk of the assembly 1 whilst still maintaining an extremely rigid structure.

In accordance with an embodiment, said arm 104, when the hub bracket body 102 is disconnected from the body of the caliper 6, comprises a bracket body arranged canti-levered that projects from the body of the hub bracket 102 starting from the vehicle-side volume V1 projecting towards the wheel-side volume V2.

In accordance with an embodiment, said caliper body 6 is connected to said hub bracket body 102 through a further third connection element 24.

In accordance with an embodiment, said third connection element 24 is arranged at the end of the first vehicle-side elongated portion 7 opposite to the first seat 18. In accordance with an embodiment, said third connection element 24 is arranged near to the disc entry end 8 of the first vehicle-side elongated portion 7.

In accordance with an embodiment, said third connection element 24 comprises a geometric coupling between said caliper body 6 and said hub bracket body 102. Preferably, said coupling of the third connection element 24 is suitable for transmitting an action between said caliper body 6 and said hub bracket body 102, at least during the braking action.

In accordance with an embodiment, said geometric coupling 24 is suitable for transmitting a contrast action to the twisting of the caliper body 6.

In accordance with an embodiment, said geometric coupling 24 is suitable for transmitting a contrast action to the twisting of the caliper body 6 about an axis parallel to the radial direction R-R, counteracting a rotation of the caliper body 6 in a plane parallel to the axis A-A, for example around an axis Z-Z of the third connection element 24.

In accordance with an embodiment, said third connection element comprises a geometric coupling 24 having a first geometric coupling portion 25, or connection foot, which extends from the first vehicle-side elongated portion 7 and inserts with geometric coupling in a fifth seat 26 foreseen in the body of the hub bracket 102 so as to make a geometric coupling suitable for opposing, for example, the twisting of the caliper body 6 around the axis Z-Z of geometric coupling of the third connection element 24.

In accordance with an embodiment, said geometric coupling portion is also defined as connection foot or geometric coupling extension 25. In accordance with an embodiment, said foot 25 has a prismatic body with a section transversal to the direction of geometric coupling Z-Z having a profile that is preferably but not necessarily polygonal, advantageously, but not necessarily, quadrangular, wherein said profile is indicated with reference numeral 111 in the figures.

In accordance with an embodiment, said third connection element 24 comprises a sixth seat 107 foreseen in the hub bracket body 102 suitable for receiving a stud bolt 108 that inserts in an seventh seat foreseen in the caliper body 6, preferably but not necessarily in which said seventh seat is a through seat so as to make an end portion of the stud bolt 108 poke out from the caliper body 6 to receive a connection nut of the caliper body 6 to the hub bracket body 102.

In accordance with an embodiment, said sixth seat 107 is arranged with extension prevalently perpendicular to the rotation axis A-A, so as to be substantially arranged in the radial direction or parallel to a radial direction R-R.

In accordance with an embodiment, said third seat or disc-exit-side bracket seat 103 of the hub bracket body 102 is arranged near to the end of the hub bracket close to the disc exit-side end 9 of the first vehicle-side elongated portion 7.

In accordance with an embodiment, said fourth seat or disc-entry-side bracket seat 106 of the hub bracket body 102 and said second seat 20 of the caliper body 6 extend according to the substantially tangential direction or substantially parallel to a tangential direction T-T. In accordance with an embodiment, said arm 104 of the hub bracket body 102 is arranged near to the disc entry-side end 14 of the second wheel-side elongated portion 12.

In accordance with an embodiment, said first seat 18 extends according to a direction parallel to the first braking surface 4 of the disc 3, a direction that preferably, but not necessarily, is arranged on a plane that passes through the first pad facing said braking surface 4.

In accordance with an embodiment, said second seat 20 of the caliper body 6 is arranged as far as axially possible from said first seat 18 or, in other words, so that the distance H in the axial direction between said first seat 18 and said second seat 20 is as wide as possible.

In accordance with a further embodiment, said second seat 20 and said third connection element 24 are arranged on a plane substantially parallel to the rotation axis A-A.

In accordance with an embodiment, between said connection elements 19, 21, 24 and the caliper body 6, preferably made from light material, like for example but not necessarily aluminium or aluminium alloy, like for example but not necessarily aluminium and lithium, there are washers or bushes made from strong material, like for example steel or titanium or else titanium coated in PVD, which prevent the connection elements from leaving an impression on the caliper body 6 with their clamping.

In accordance with an embodiment, also forming the object of the present invention is a caliper body of a fixed caliper of a disc brake, in which said fixed caliper 2 is suitable for being arranged astride of a disc 3 for a disc brake. Said disc 3 has a first braking surface 4 and a second braking surface 5, opposite the first. Said disc 3 defines an axial direction parallel to a rotation axis A-A thereof, a tangential or circumferential direction T-T, parallel to one of its braking surfaces, with disc entry direction I and disc exit direction U, and a radial direction R-R perpendicular to the axial direction A-A and to the circumferential or tangential direction T-T, the latter defining an outer radial direction RO when facing away from the rotation axis of the disc. Said disc defines a vehicle-side volume V1 suitable for comprising the space that from the plane D containing the disc proceeds towards the vehicle, and a wheel-side volume V2 comprising the space that from the plane D containing the disc goes away from the vehicle.

In accordance with an embodiment, said caliper body 6 comprises a first vehicle-side elongated portion 7. In accordance with an embodiment, said vehicle-side elongated portion 7 comprises a first disc entry-side tangential end 8 and a second disc exit-side tangential end 9.

In accordance with an embodiment, said vehicle-side elongated portion 7 is suitable for facing an axial inner surface 10 thereof towards the first braking surface 4 of the disc 3. In accordance with an embodiment, said first vehicle-side elongated portion 7 houses at least one cylinder 11 suitable for receiving a piston to exert a pressure on at least one pad housed between said vehicle-side elongated portion 7 of the caliper body 6 and said braking surface 4 of the disc 3. In accordance with an embodiment, said caliper body 6 also comprises a second wheel-side elongated portion 12 facing an axial inner surface 13 thereof towards the second braking surface 5 of the disc 3 and comprises a first disc entry-side tangential end 14 and a second disc exit-side end 15. In accordance with an embodiment, said second wheel-side elongated portion 12 houses at least one cylinder 16 suitable for receiving a piston to exert a pressure on an opposite pad housed between said second wheel-side elongated portion 12 of the caliper body 6 and said second braking surface 5 of the disc 3.

In accordance with an embodiment, said first and second elongated portions 7, 12 are connected together by at least one bridge 17 arranged astride of the disc 3 that firmly connects said first vehicle-side elongated portion 7 to said second wheel-side elongated portion 12 so as to prevent their relative movements and limit the deformation of the caliper body 6.

In accordance with an embodiment, said caliper body 6 also comprises at least one first seat 18 to receive a first connection element 19 to connect said fixed caliper to a hub bracket 101.

In accordance with an embodiment, said at least one first seat 18 is arranged in said first vehicle-side elongated portion 7.

In accordance with an embodiment, said caliper body 6 of said fixed caliper 2 comprises at least one second seat 20 to receive a second connection element 21 of the caliper body 6 to the hub bracket 101, in which said at least second seat 20 is arranged in said second wheel-side elongated portion 12.

In accordance with an embodiment, said second seat 20 is suitable for receiving the second connection element 21 for the connection of the caliper body 6 to the hub bracket body 102.

In accordance with an embodiment, an object of the present invention is a hub bracket 101 of a fixed caliper 2 of a disc brake, suitable for making a support for a fixed caliper 2.

In accordance with an embodiment, said hub bracket 101 comprises a hub bracket body 102 arranged substantially in a vehicle-side volume V1 defined by the space that extends from a plane D containing a disc 3 for a disc brake going towards the vehicle. Said hub bracket body 102 is suitable for being connected to arms of the vehicle's suspension, and is suitable for housing a bearing to support a hub able to be connected to said disc 3 and to a wheel of the vehicle.

In accordance with an embodiment, said hub bracket body 102 comprises at least one third seat or disc-exit-side bracket seat 103 to receive a first connection element 19 to firmly connect a first vehicle-side elongated portion 7 of said fixed caliper 2 to said hub bracket body 102.

In accordance with an embodiment, said hub bracket body 102 has an arm 104 that from said hub bracket body 102 extends astride of the disc 3 taking a portion of the arm 105 in a wheel-side volume V2 defined by the space that extends away from the plane D that contains said disc 3 going away from the vehicle.

In accordance with an embodiment, said portion of the arm arranged on the wheel side 105 has a fourth seat or disc-entry-side bracket seat 106 to receive a second connection element 21 suitable for connecting the fixed caliper 2 to the hub bracket body 102.

Thanks to the assembly described above it is possible to reduce the deformation of the caliper body when subjected to braking actions. In particular, it is possible to reduce the deformation of the caliper body subjected to the braking action both in the tangential direction and in the axial direction.

Thanks to the reduction in deformation of the caliper body it is possible to reduce the stroke of the brake pump of the vehicle and thus use a smaller amount of brake fluid.

Less deformation of the caliper body also and above all means less "tilting" of the caliper subjected to the braking torque. Thanks to less deformation of the caliper body the pads are better drawn towards the brake disc and therefore there is uniform consumption of the friction material of the pads.

Less deformation of the caliper body also means less hysteresis due to the deformation and elastic recovery of the caliper body.

Thanks to all of the above the braking system equipped with the assembly described above makes it possible to obtain greater constancy in the braking actions and greater modulation of the single braking, allowing the driver to have greater control of the vehicle, greatly benefiting the driving safety.

Figures 30, 31:
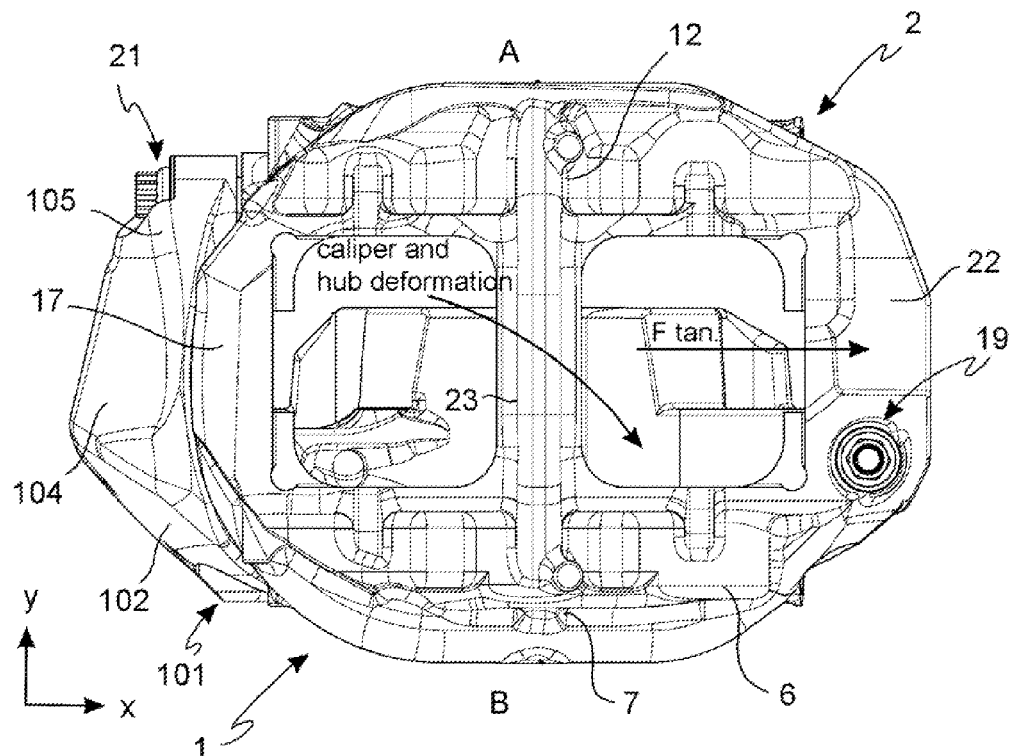
FIG. 30 represents a radial view from the caliper towards the rotation axis of the disc of an assembly of a fixed caliper and its support, or hub bracket, in which some of the actions exerted on the caliper body by the braking action are highlighted.
FIG. 31 represents a table showing the deformation variations in two measurement points of the caliper body as indicated in FIG. 30, as well as the variation in stroke of the brake pump, comparing the solution object of the invention and an analogous solution of the state of the art in which the caliper body is fixed with just its hub-side elongated element to its support.
Figure 32:
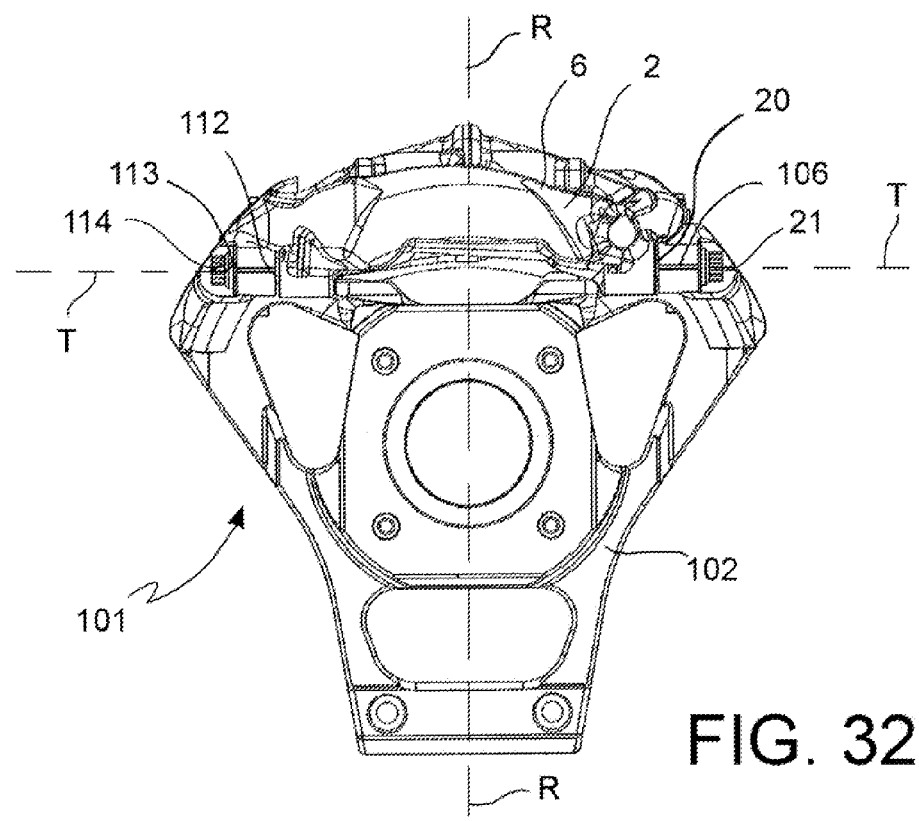
FIGS. 32 to 38 show an assembly comprising caliper and support, or hub bracket, according to a further embodiment.
Figure 33:
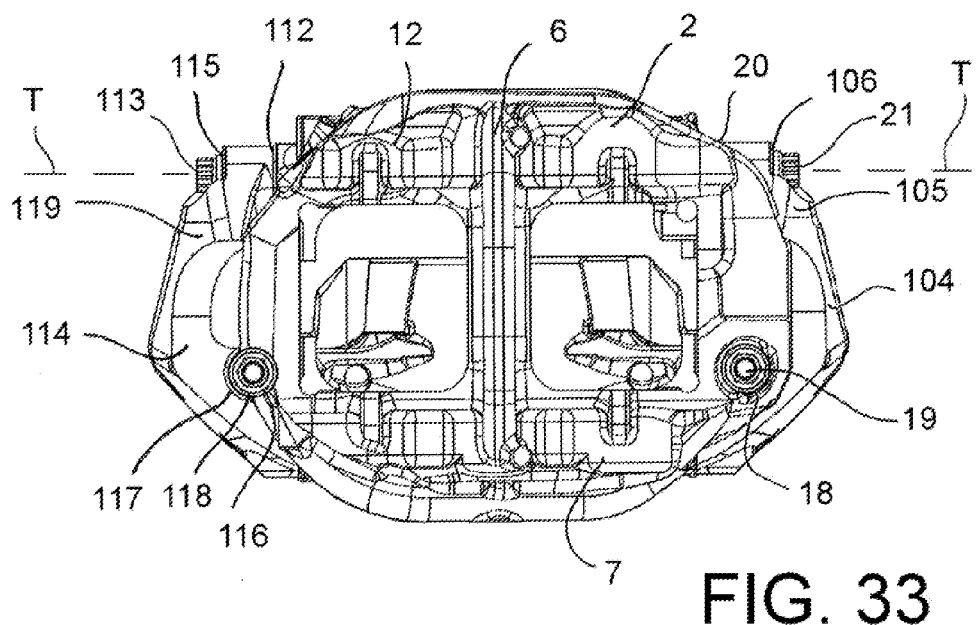
Figure 34:
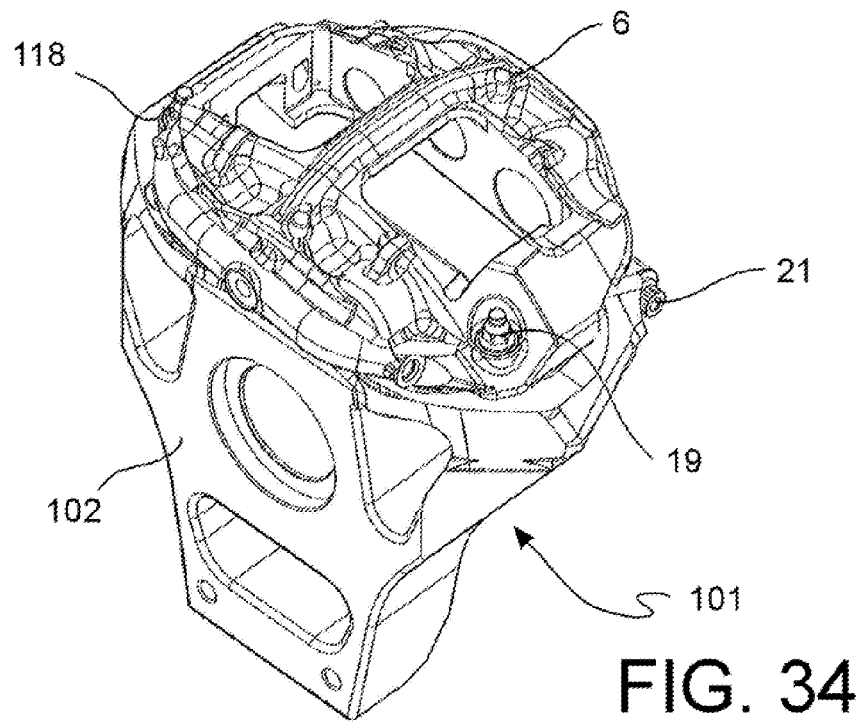
Figure 35:
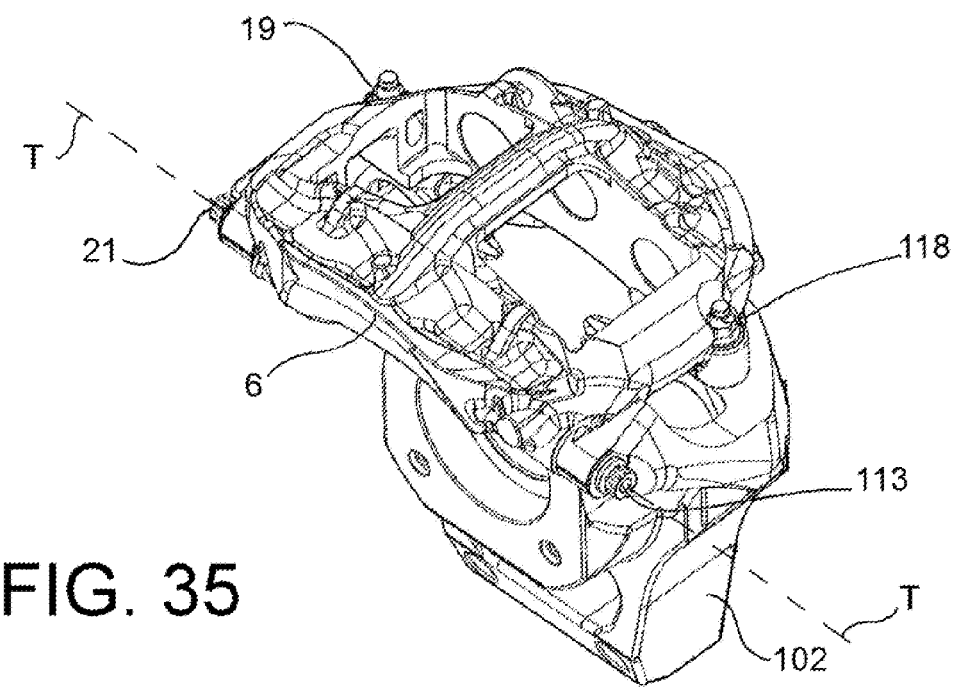
Figures 36, 37:
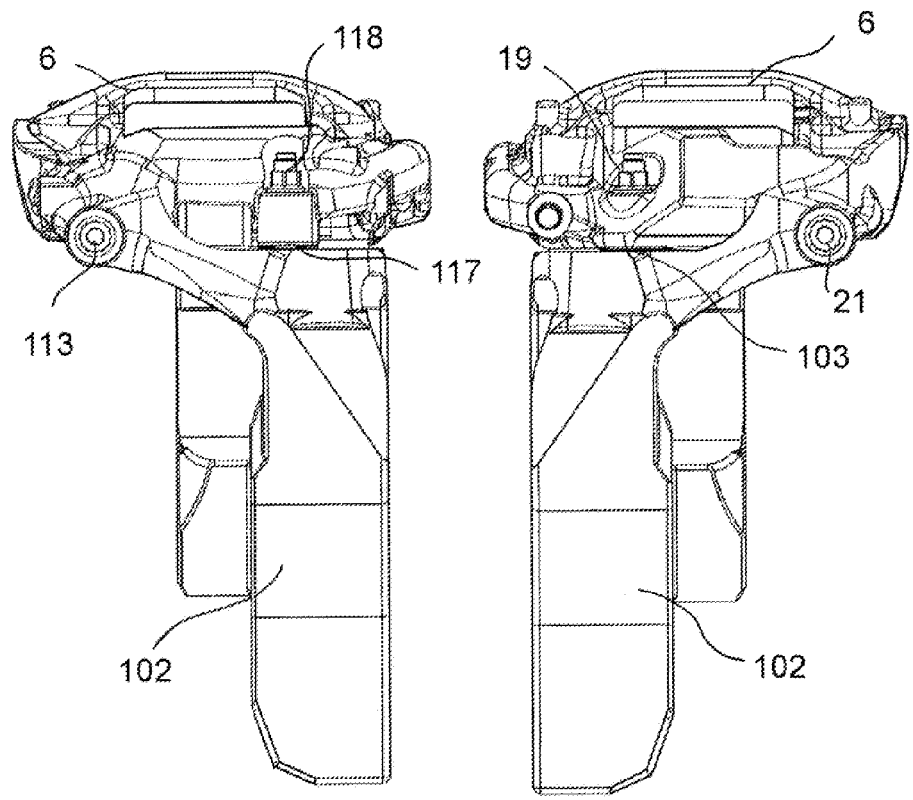
Figure 38:
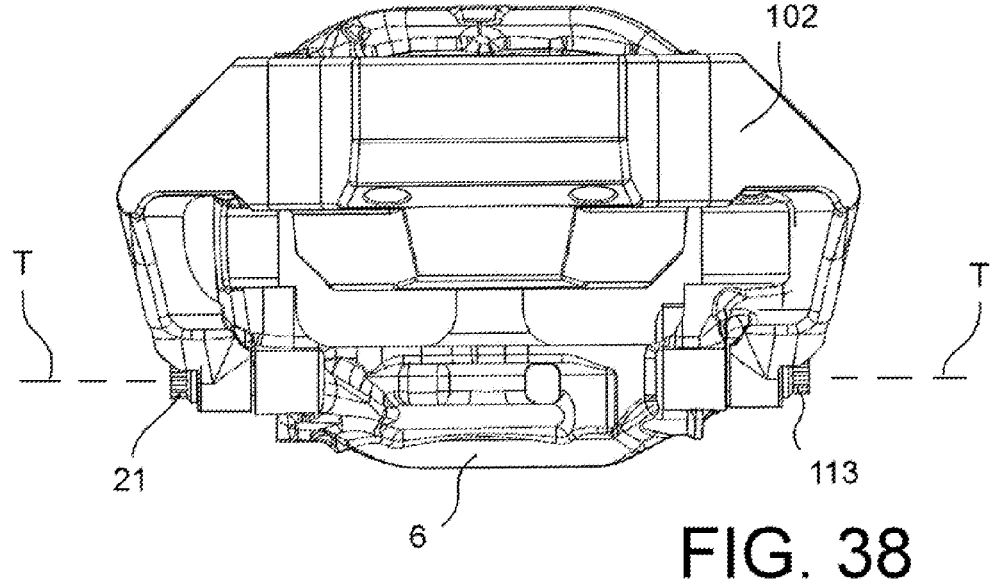

As can be seen also from FIGS. 30 and 31, the assembly according to the invention when compared to a caliper of the state of the art that is totally identical but conventionally constrained to its support through two stud bolt connections on its hub or vehicle-side elongated element, displays substantially greater rigidity and lower consumption of brake fluid to generate the same braking action.

In particular, by measuring both the deformation of the assembly according to the invention and the caliper of the state of the art at the points indicated in FIG. 30 with A and B, it can be seen (at the point indicated with B) that there is a deformation that in the central portion of the vehicle-side elongated portion is 14% less in the solution object of the invention and (at the point indicated with A) there is a deformation that in the central portion of the wheel-side elongated portion is 22% less in the solution object of the invention compared to the state of the art.

In these conditions of use, there is also a measured reduction in stroke of the brake pump of 19% in the solution of the invention when compared to the solution of the state of the art.

A man skilled in the art can bring modifications, adaptations and replacements of elements with other functionally equivalent ones to the embodiments of the device described above, in order to satisfy contingent requirements, without for this reason departing from the scope of the following claims. Each of the characteristics described as belonging to a possible embodiment can be made independently from the other embodiments described.

In accordance with an embodiment, an assembly 1 comprises a caliper body 6 of a fixed caliper 2 that comprises at least one eighth seat or disc-exit-side caliper seat 112 to receive a tangentially extending connection element 113. In accordance with an embodiment, said at least eighth seat or disc-exit-side caliper seat 112 is arranged in said second wheel-side elongated portion 12.

In accordance with an embodiment, said hub bracket body 102 has a second arm 114 that extends astride of the disc 3 taking a portion of the arm 119 in said wheel-side volume V2.

In accordance with an embodiment, said portion of the arm arranged on the wheel side 119 has a tenth seat or tangentially external seat 115 to receive the tangentially extending connection element 113 for the connection of the caliper body 6 to the hub bracket body 102.

In accordance with an embodiment, said tenth seat or tangentially external seat 115 of the hub bracket body 102 and said eighth seat or disc-exit-side caliper seat 112 of the caliper body 6 extend according to the substantially tangential direction or substantially parallel to a tangential direction T-T.

In accordance with an embodiment, said at least second seat 20 is arranged in said second wheel-side elongated portion 12 near to its disc entry end 14.

In accordance with an embodiment, said at least one second seat 20 is arranged in said second wheel-side elongated portion 12 near to its disc exit end 15.

In accordance with an embodiment, said caliper body 6 also comprises at least one ninth seat or caliper radially extending seat 116 to receive a radially extending connection element 118 to connect said fixed caliper to said hub bracket 101. In accordance with an embodiment, said at least one ninth seat or caliper radially extending seat 116 is arranged in said first vehicle-side elongated portion 7.

In accordance with an embodiment, said hub bracket body 102 comprises at least one eleventh seat or bracket radially extending seat 117 to receive said radially extending connection element 118 to firmly connect said first vehicle-side elongated portion 7 to said hub bracket body 102.

In accordance with an embodiment, the body of the hub bracket is substantially symmetrical in a mirroring fashion with respect to a radial axis R-R passing through the centre of the seat of the bearing.

In accordance with an embodiment, the body of the caliper is symmetrical with respect to a radial axis R-R.

Thanks to the embodiments described above, the connection between the caliper body and the hub bracket is substantially aligned with the resultant of the braking force, allowing the connection, for example the stud bolt, to be stressed prevalently according to its axial direction and thus much better exploiting its characteristics of mechanical strength, allowing a correct and simpler sizing of the connection.

Thanks to the embodiments described above, it is possible to pretension or preload the connection between the caliper body and the hub bracket making it possible to control the deformation of the caliper body with extreme precision during braking, for example ensuring that it is substantially in an undeformed condition when subjected to a medium intensity braking action.

This control of the deformation of the caliper makes it possible to obtain less and in any case more controlled hysteresis of the caliper body, making it possible to have a much more responsive braking system with respect to the braking systems of the state of the art.

REFERENCES

1 Assembly
2 Fixed caliper
3 Disc
4 First braking surface
5 Second braking surface
6 Caliper body
7 First vehicle-side elongated portion
8 First disc entry-side tangential end
9 Second disc exit-side tangential end
10 first disc facing portion surface
11 at least one first elongated portion cylinder
12 second wheel-side elongated portion
13 second disc facing portion surface
14 second elongated portion disc entry-side end
15 second elongated portion disc exit end
16 at least one second elongated portion cylinder
17 at least one bridge between the first and second elongated portion
18 at least one first seat vehicle-side caliper body
19 at least a first connection element
20 second seat on second wheel-side elongated portion
21 second wheel-side connection element
22 elongated portion second connecting bridge
23 elongated portion third connecting bridge
24 hub bracket body third connection element
25 caliper body portion of geometric coupling
26 geometric coupling fifth seat
30 first elongated portion central section
31 second elongated portion central section
32 stud bolt (first connection element)
33 first connection element lock nut
34 stud bolt free end
35 abutment surface for first connection element caliper body
36 washer
37 washer with a stop
38 extension suitable for being inserted into the first seat 18
39 stud bolt size calibrated shank section
40 second connection element stud bolt
41 section able to be inserted in seat 20 of the caliper body
42 stud bolt size calibrated section
43 washer
44 washer with stop
45 internally and externally threaded bush
46 groove for receiving transversal threading stops
47 bush threaded outer surface
48 bush threaded inner surface
49 gap to house at least one first vehicle-side pad
50 gap to house at least one second wheel-side pad
101 hub bracket or torque plate
102 hub bracket body
103 third seat or disc-exit-side bracket seat to receive the first connection element
104 arm extending astride of the disc
105 wheel-side arm portion
106 fourth seat or disc-entry-side bracket seat to receive the second connection element
107 sixth seat
108 sixth seat stud bolt
109 hub bracket windows
110 arm groove receiving a peripheral portion of the disc
111 geometric coupling polygonal profile
112 eighth seat or disc-exit-side caliper seat on wheel-side elongated portion
113 stud bolt tangentially extending connection element tangential direction
114 hub bracket second arm that extends astride of the disc
115 tenth seat or tangentially external seat on hub bracket to receive a tangentially extending connection element
116 ninth seat or caliper radially extending seat on vehicle-side elongated portion
117 eleventh seat or bracket radially extending seat on hub bracket body
118 radially extending connection element able to be inserted in a ninth seat or caliper radially extending seat and eleventh seat or bracket radially extending seat
119 portion of the arm arranged in said wheel-side

What is claimed is:

1. Assembly of fixed caliper and hub bracket of a disc brake, comprising
a fixed caliper, suitable for being arranged astride of a disc for a disc brake, said disc having a first braking surface and a second braking surface opposite the first, said disc defining an axial direction parallel to a rotation axis thereof, a tangential or circumferential direction parallel to one of its braking surfaces, with a disc entry direction and a disc exit direction, and a radial direction perpendicular to the axial direction and to the circumferential or tangential direction, the latter defining an outer radial direction when facing away from the rotation axis of the disc; said disc defining a vehicle-side volume suitable for comprising the space that from the plane containing the disc proceeds towards the vehicle, and a wheel-side volume comprising the space that from the plane containing the disc goes away from the vehicle;
said fixed caliper comprising a caliper body having a first vehicle-side elongated portion; said vehicle-side elongated portion comprising a first disc entry-side tangential end and a second disc exit-side tangential end; said vehicle-side elongated portion being suitable for facing an axial inner surface thereof towards the first braking surface of the disc; said first vehicle-side elongated portion housing at least one cylinder suitable for receiving a piston to exert a pressure on at least one pad housed between said vehicle-side elongated portion of the caliper body and said braking surface of the disc;
said caliper body also comprising a second wheel-side elongated portion facing its axial inner surface towards the second braking surface of the disc and comprising a first disc entry-side tangential end and a second disc exit-side end; said second wheel-side elongated portion housing at least one cylinder suitable for receiving a piston to exert a pressure on an opposite pad housed between said second wheel-side elongated portion of the caliper body and said second braking surface of the disc;
said first and second elongated portions being connected together by at least one bridge arranged astride of the disc that firmly connects said first vehicle-side elongated portion to said second wheel-side elongated portion so as to prevent their relative movements and limit the deformation of the caliper body;

said caliper body also comprising at least one first seat to receive a first connection element to connect said fixed caliper to said hub bracket;

said at least one first seat being arranged in said first vehicle-side elongated portion;

said caliper body of said fixed caliper also comprises at least one second seat to receive a second connection element;

said hub bracket of said assembly making a support for the fixed caliper and comprising:

a hub bracket body arranged substantially in said vehicle-side volume; said hub bracket body being suitable for being connected to an arm of the vehicle's suspension; said hub bracket body comprising at least one third seat to receive said first connection element to firmly connect said first vehicle-side elongated portion to said hub bracket body; wherein, said at least second seat is arranged in said second wheel-side elongated portion, and wherein said hub bracket body has an arm that from said hub bracket body extends astride of the disc carrying a portion of the arm in said wheel-side volume, and wherein said portion of the arm arranged on the wheel-side has a fourth seat to receive the second connection element for the connection of the caliper body to the hub bracket body, characterised in that said hub bracket body is suitable for housing a bearing to support a hub able to be connected to said disc and to a wheel of the vehicle;

and wherein said fourth seat of the hub bracket body and said second seat of the caliper body extend according to the substantially tangential direction or substantially parallel to a tangential direction.

2. Assembly according to claim 1, wherein said at least one first seat is arranged at the disc-exit end of the first vehicle-side elongated portion; and wherein said first seat has an extension thereof arranged transversally to the rotation axis according to a substantially radial direction or parallel to a radial direction;

wherein, when said caliper body is arranged coupled with said hub bracket, said at least one first seat is aligned with said third seat, wherein said at least one first seat passes right through and receives said first connection element.

3. Assembly according to claim 1, wherein said at least one bridge connects the disc entry ends of said first vehicle-side elongated portion and said second wheel-side elongated portion, or wherein said first vehicle-side elongated portion is connected to said second wheel-side elongated portion through a second bridge arranged astride of the disc and suitable for firmly connecting the disc exit end of said elongated portions, or wherein there is a third bridge connecting central sections of said first vehicle-side elongated portion and said second wheel-side elongated portion.

4. Assembly according to claim 1, wherein, said hub bracket body has a single arm extending astride of the disc, wherein said arm is arranged facing the disc entry ends of said first vehicle-side elongated portion and said second wheel-side elongated portion, or wherein said arm, when the hub bracket body is disconnected from the body of the caliper, is a bracket canti-levered from the body of the hub bracket arranged in the vehicle-side volume.

5. Assembly according to claim 1, wherein said caliper body is connected to said hub bracket body through a further third connection element, and wherein said third connection element is arranged at the end of the first vehicle-side elongated portion opposite to the first seat, and wherein said third connection element is arranged near to the disc entry end of the first vehicle-side elongated portion;

wherein said third connection element comprises a geometric coupling between said caliper body and said hub bracket body suitable for transmitting an action between said caliper body and said hub bracket body at least during the braking action, or wherein said geometric coupling is suitable for transmitting a contrast action to the twisting of the caliper body around an axis parallel to the radial direction counteracting a rotation of the caliper body in a plane parallel to the axis;

wherein said geometric coupling comprises a portion of geometric coupling, or connection foot, which extends from the first vehicle-side elongated portion and inserts with geometric coupling in a fifth seat foreseen in the body of the hub bracket so as to have a geometric coupling suitable for opposing the twisting of the caliper body around the axis of geometric coupling of the third connection element, or wherein said extension of geometric coupling has a section transversal to the geometric coupling, having a polygonal profile, preferably quadrangular;

wherein said third connection element comprises a sixth seat foreseen in the hub bracket body suitable for receiving a stud bolt suitable for being inserted in an seventh seat foreseen in the caliper body preferably passing right through so as to make an end portion of the stud bolt poke out from the caliper body to receive a connection nut of the caliper body to the hub bracket body, wherein said sixth seat is arranged with extension mainly perpendicular to the rotation axis so as to be substantially arranged in the radial direction or parallel to a radial direction.

6. Assembly according to claim 1, wherein said third seat of the hub bracket body is arranged at the end of the hub bracket close to the disc exit-side end of the first vehicle-side elongated portion, wherein said fourth seat and said second seat extend according to a tangential direction or substantially parallel to a tangential direction, or wherein said arm of the hub bracket body is arranged near to the disc entry-side end of the second wheel-side elongated portion; or wherein said first seat is arranged in a plane parallel to the first braking surface of the disc that passes through the first pad facing said braking surface, and/or wherein said second seat is arranged as far as possible axially from said first seat, in other words, so that the distance in the axial direction between said first seat and said second seat is as wide as possible;

wherein said first seat, said second seat and said third connection element are arranged substantially on a plane parallel to the rotation axis.

7. Assembly according to claim 1, wherein between said connection elements and the caliper body, preferably made from light material, such as aluminium or aluminium alloy, there are washers or bushes made from strong material like for example steel or titanium that prevent the connection elements leaving an impression on the caliper body when they are tightened.

8. Assembly according to claim 1, wherein said caliper body of said fixed caliper comprises at least one disc-exit-side caliper seat to receive a tangentially extending connection element, wherein said at least disc-exit-side caliper seat is arranged in said second wheel-side elongated portion, and in that said hub bracket body has a second arm that extends astride of the disc taking a portion of the arm in said wheel-side volume, and wherein said portion of the arm arranged on the wheel side has a tangentially external seat to receive the tangentially extending connection element for the connection of the caliper body to the hub bracket body;

wherein said tangentially external seat of the hub bracket body and said disc-exit-side caliper seat of the caliper body extend according to the substantially tangential direction or substantially parallel to a tangential direction.

9. Assembly according to claim 1, wherein said at least second seat is arranged in said second wheel-side elongated portion near to its disc entry end or wherein said at least second seat is arranged in said second wheel-side elongated portion near to its disc exit end; and/or wherein said caliper body also comprises at least one caliper radially extending seat to receive a radially extending connection element to connect said fixed caliper to said hub bracket; said at least one caliper radially extending seat being arranged in said first vehicle-side elongated portion, and wherein said hub bracket body comprising at least one bracket radially extending seat to receive said radially extending connection element to firmly connect said first vehicle-side elongated portion to said hub bracket body.

10. Caliper body of a fixed caliper of a disc brake, wherein a fixed caliper is suitable for being arranged astride of a disc for a disc brake, said disc having a first braking surface and a second braking surface opposite the first, said disc defining an axial direction parallel to a rotation axis thereof, a tangential or circumferential direction parallel to one of its braking surfaces, with disc entry direction and disc exit direction, and a radial direction perpendicular to the axial direction and to the circumferential or tangential direction, the latter defining an outer radial direction when facing away from the rotation axis of the disc, said disc defining a vehicle-side volume suitable for comprising the space that from the plane containing the disc proceeds towards the vehicle, and a wheel-side volume comprising the space that from the plane containing the disc goes away from the vehicle;

said fixed caliper comprising a caliper body having a first vehicle-side elongated portion; said vehicle-side elongated portion comprising a first disc entry-side tangential end and a second disc exit-side tangential end; said vehicle-side elongated portion being suitable for facing an axial inner surface thereof towards the first braking surface of the disc; said first vehicle-side elongated portion housing at least one cylinder suitable for receiving a piston to exert a pressure on at least one pad housed between said vehicle-side elongated portion of the caliper body and said braking surface of the disc;

said caliper body also comprising a second wheel-side elongated portion with an axial inner surface thereof facing the second braking surface of the disc and comprising a first disc entry-side tangential end and a second disc exit-side end; said second wheel-side elongated portion housing at least one cylinder suitable for receiving a piston to exert a pressure on an opposite pad housed between said second wheel-side elongated portion of the caliper body and said second braking surface of the disc;

said first and second elongated portions being connected together by at least one bridge arranged astride of the disc that firmly connects said first vehicle-side elongated portion to said second wheel-side elongated portion so as to prevent their relative movements and limit the deformation of the caliper body;

said caliper body also comprising at least one first seat to receive a first connection element to connect said fixed caliper to a hub bracket; said at least one first seat being arranged in said first vehicle-side elongated portion;

wherein, said caliper body of said fixed caliper comprises at least one second seat to receive a second connection element to the hub bracket, wherein said at least second seat is arranged in said second wheel-side elongated portion, and in that said second seat is suitable for receiving the second connection element for the connection of the caliper body to the hub bracket body characterised in that said second seat of the caliper body extends according to the substantially tangential direction or substantially parallel to a tangential direction.

11. Caliper body according to claim 10, wherein said caliper body of said fixed caliper comprises at least one disc-exit-side caliper seat to receive a tangentially extending connection element, wherein said at least disc-exit-side caliper seat is arranged in said second wheel-side elongated portion; and wherein said disc-exit-side caliper seat of the caliper body extends according to the substantially tangential direction or substantially parallel to a tangential direction;

wherein said at least second seat is arranged in said second wheel-side elongated portion near to its disc entry end or wherein said at least second seat is arranged in said second wheel-side elongated portion near to its disc exit end.

12. Caliper body according to claim 10, wherein said caliper body also comprises at least one caliper radially extending seat to receive a radially extending connection element to connect said fixed caliper to said hub bracket; said at least one caliper radially extending seat being arranged in said first vehicle-side elongated portion.

13. Hub bracket of a fixed caliper of a disc brake, suitable for making a support for a fixed caliper comprising:

a hub bracket body arranged substantially in un vehicle-side volume defined by the space that extends from a plane containing a disc for a disc brake associated with said fixed caliper going towards the vehicle; said hub bracket body being suitable for being connected to an arm of the vehicle's suspension, and being suitable for housing a bearing to support a hub able to be connected to said disc and to a wheel of the vehicle; said hub bracket body comprising at least one disc-exit-side bracket seat to receive a first connection element to firmly connect a first vehicle-side elongated portion of said fixed caliper to said hub bracket body; wherein, said hub bracket body has an arm that from said hub bracket body extend astride of the disc carrying a portion of the arm in a wheel-side volume defined by the space extending away from the plane that contains said disc going away from the vehicle, and wherein said portion of the arm arranged on the wheel side has a disc-entry-side bracket seat to receive a second connection element for connecting the fixed caliper to the hub bracket body characterised in that said hub bracket body is suitable for housing a bearing to support a hub able to be connected to said disc and to a wheel of the vehicle;

and wherein said disc-entry-side bracket seat of the hub bracket body extends according to the substantially tangential direction or substantially parallel to a tangential direction.

14. Hub bracket according to claim 13, wherein said hub bracket body has a second arm that extends astride of the disc taking a portion of the arm in said wheel-side volume, and wherein said portion of the arm arranged on the wheel side has a tangentially external seat to receive a tangentially extending connection element for the connection of a caliper body to the hub bracket body;

wherein said tangentially external seat of the hub bracket body extends according to the substantially tangential direction or substantially parallel to a tangential direction.

15. Hub bracket according to claim 13, wherein said hub bracket body comprising at least one bracket radially extending seat to receive a radially extending connection element to firmly connect the first vehicle-side elongated portion to said hub bracket body.

* * * * *